United States Patent
Shinzaki et al.

(10) Patent No.: US 7,188,086 B2
(45) Date of Patent: Mar. 6, 2007

(54) CONFIDENTIAL INFORMATION MANAGEMENT SYSTEM AND INFORMATION TERMINAL FOR USE IN THE SYSTEM

(75) Inventors: Takashi Shinzaki, Kawaski (JP); Takashi Morihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 236 days.

(21) Appl. No.: 09/947,759

(22) Filed: Sep. 7, 2001

(65) Prior Publication Data

US 2003/0004881 A1    Jan. 2, 2003

(30) Foreign Application Priority Data

Feb. 7, 2001   (JP) .............................. 2001-030839

(51) Int. Cl.
  *G06F 17/00*   (2006.01)
(52) U.S. Cl. ............................................ 705/51; 726/1
(58) Field of Classification Search ................... 705/51, 705/67
  See application file for complete search history.

(56) References Cited

U.S. PATENT DOCUMENTS

| | | | |
|---|---|---|---|
| 6,275,941 | B1 | 8/2001 | Saito et al. |
| 6,292,899 | B1* | 9/2001 | McBride ........................ 726/22 |
| 2001/0012144 | A1* | 8/2001 | Miyazaki et al. ............. 359/188 |
| 2002/0104002 | A1* | 8/2002 | Nishizawa et al. .......... 713/168 |
| 2002/0120864 | A1* | 8/2002 | Wu et al. ..................... 713/201 |
| 2002/0194473 | A1* | 12/2002 | Pope et al. .................. 713/168 |
| 2002/0199118 | A1* | 12/2002 | Yardley et al. .............. 713/201 |
| 2005/0102388 | A1* | 5/2005 | Tabbara et al. .............. 709/223 |
| 2005/0177716 | A1* | 8/2005 | Ginter et al. ................ 713/157 |

FOREIGN PATENT DOCUMENTS

| | | |
|---|---|---|
| JP | 9-251426 | 9/1997 |
| JP | 10-242957 | 9/1998 |
| JP | 10-260903 | 9/1998 |
| JP | 10-269184 | 10/1998 |
| JP | 10-320478 | 12/1998 |
| JP | 11-258985 | 9/1999 |
| JP | 2000-268096 | 9/2000 |

OTHER PUBLICATIONS

Notice of Ground of Rejection (Office Action) mailed Nov. 1, 2005 and English translation.
Office Action mailed Feb. 28, 2006 (Notice of Ground of Rejection).

* cited by examiner

*Primary Examiner*—Firmin Backer
(74) *Attorney, Agent, or Firm*—Staas & Halsey LLP

(57) ABSTRACT

The present invention provides a confidential information management system which allows users to securely obtain confidential information files containing various confidential information, which files are securely stored in the present system, anywhere and anytime, using a minimum of confidential information. A confidential information file and encoding/decoding software are downloaded to an information terminal from a confidential information managing server and an encoding/decoding software managing server, respectively, so that the confidential information file is decoded on the information terminal by using the encoding/decoding software. The present system is applicable to various (computer) systems which store and manage confidential information (ID numbers, passwords, encryption keys, digital certificates, etc.) for use in user verification.

46 Claims, 15 Drawing Sheets

CONFIDENTIAL INFORMATION MANAGEMENT SYSTEM AND INFORMATION TERMINAL FOR USE IN THE SYSTEM

BACKGROUND OF THE INVENTION

1. Field of the Invention

The present invention relates to a confidential information management system suitable for use in storing and managing various types of information (confidential information: ID numbers, passwords, encryption keys, digital certificates, etc.) to be used in user verification. The present invention also relates to information terminals employed in the present system for downloading such confidential information thereto.

2. Description of the Related Art

User verification (to confirm an object user of a system or an application is an authorized user) has recently been carried out by using confidential information, such as personal identification codes and passwords (hereinafter will be also called "password verification"). In this method, the confidential information input by the object user is compared with that registered previously. If the two are then decided to be identical, the object user is verified. This method provides a handy, user-friendly verification, and thus is the most common method of user verification in today's system infrastructure.

Multifunctional mobile information terminals {various types of potable information terminals such as PDAs (personal digital assistants) and mobile telephones} nowadays not only function as electronic notepads or telephones but also receive/transmit electronic information and image information via wired/wireless networks. Further, such mobile information terminals can also be used in bank account settlement, electronic commerce, or securities trading. For realizing these varying functions in one mobile information terminal, various types of applications are started or executed on the mobile information terminal.

When such applications are started or executed on the mobile information terminal, an ID and a password must be input for each application. Likewise, when bank account settlement or electronic commerce transaction is performed, a bank account number and a personal identification code must be input. In general, such an ID and a bank account number are previously stored in a memory or the like so that it is unnecessary for the user to input such numbers by himself/herself, while the confidential information (password and personal identification code) for use in user verification must be input by the user with push or touch buttons (ten keys).

Accordingly, the user must remember plural passwords or personal identification codes, one for each application or system (bank, etc.). In cases where a variety of passwords and personal identification codes are used, the following problems (a) through (d) are encountered.

(a) Many of users tend to use an easy-to-remember string of characters or digits as a password or a PIN; for example, the user's or family member's name or birthday, telephone number, favorite word, etc. Assuming that an information terminal with such passwords or personal identification codes registered is stolen or lost, there is a danger that an unauthorized person might use the bank account settlement or electronic commerce function equipped in the terminal.

(b) Using passwords or personal identification codes in user verification makes the system simple with reduced manufacturing cost, but it is necessary for the user to be security-conscious. Otherwise if hard-to-remember passwords or personal identification codes are used in an effort to increase the security, the user might forget them. If the passwords or personal identification codes are stored in the information terminal for the user's convenience, they can be easily read by unauthorized persons because of the poor security so that the unauthorized person can use the above-mentioned functions of the terminal.

(c) A single-sign-on system or LDAP (lightweight directory access protocol), in which a single password is used to log-in to plural systems collectively, is rendered poor in security, because an unauthorized person may access all the relevant systems merely by inputting the one single password.

(d) Since the single-sign-on system is based on the premise that each of the relevant systems is associated with one another, it is difficult to support all systems by a single-sign-on system.

In the meantime, in addition to the above-mentioned confidential information, the user's property (ID card, etc.) and the user's biometric information (fingerprint, palmprint, finger shape, hand shape, voiceprint, retina, iris, facial recognition, signature dynamics, blood vessel pattern, key strokes, etc.), unique to the user, are also used in verifying the user.

The former is disadvantageous in that user verification cannot be performed if the user forgets to carry the property (ID card, etc.) on him/her. Further, since an unauthorized person can also use the property, the security level is low.

The latter is disadvantageous not only in that all users cannot employ the method, but also in that plural IDs must be remembered, one for each system, thereby necessitating troublesome management of those IDs for the user. Moreover, in order to employ this method, it is necessary to make significant changes to existing user verification infrastructures which are adapted to the currently popular types of password verification.

In view of these, it has been hoped that an effective and secure use of the conventional password verification is accomplished, without employing such as a single-sign-on system, nor making any changes to the existing user verification infrastructures.

SUMMARY OF THE INVENTION

With the foregoing problems in view, one object of the present invention is to provide a confidential information management system which allows users to securely obtain confidential information files containing various confidential information, which files are securely stored in the present system, anywhere and anytime, using a minimum of confidential information.

Another object of the invention is to provide an information terminal for use in the system.

In order to accomplish the above object, according to the present invention, there is provided a confidential information management system comprising: a confidential information managing server for storing and managing confidential information files each in an encoded form in such a manner that each of the confidential information files is available to only an authorized user; an encoding/decoding software managing sever for storing and managing encoding/decoding software which encodes/decodes the individual confidential information files; and one or more information terminals each capable of having access to both the confidential information managing server and the encoding/decoding software managing sever via a communications network. Each of the information terminals has an environment such as to operate the encoding/decoding software, and is operable, after an authorized user who intends to access an individual confidential information file is verified, to download the last-named individual confidential information file and the encoding/decoding software from the confidential information managing server and the encoding/decoding software managing sever, respectively, and to decode the downloaded confidential information file using the encoding/decoding software.

As one preferred feature, the confidential information management system further comprises an access managing server for managing access attempts of the user from the information terminal to both the confidential information managing server and the encoding/decoding software managing server by verifying the user, and the access managing server is operable, upon completion of the user verification, to permit the information terminal to access both the confidential information managing server and the encoding/decoding software managing server.

As another preferred feature, the confidential information management system further comprises a secure server for providing a secure environment in communications between the access managing server and the information terminal.

As still another preferred feature, in the confidential information management system, the information terminal is operable, if any change has been made to the decoded confidential information file, or if a new confidential information file is intended to be stored in the confidential information managing server, to encode the resulting confidential information file or the new confidential information file using the encoding/decoding software before uploading such encoded confidential information file to the confidential information managing server.

As one generic feature of the present invention, there is provided an information terminal adapted to be capable of having access to both a confidential information managing server, which stores and manages confidential information files each in an encoded form in such a manner that each of the confidential information files is available to only an authorized user, and an encoding/decoding software managing server, which stores and manages encoding/decoding software for encoding/decoding the individual confidential information files, via a communications network, wherein: the information terminal has an environment such as to operate the encoding/decoding software; and after an authorized user who intends to access an individual confidential information file is verified, the information terminal is operable to download the last-named individual confidential information file and the encoding/decoding software from the confidential information managing server and the encoding/decoding software managing server, respectively, and to decode the downloaded individual confidential information file using the encoding/decoding software.

With using the confidential information management system and the information terminal of the present invention, a user can obtain a confidential information file anywhere with a minimum of confidential information. In more particular, after the user is verified with the minimal confidential information, the user is allowed to obtain the confidential information file on the information terminal. At that time, since the thus obtained confidential information file is an encoded file, it cannot be decoded without using a type of decoding software corresponding to the encoding software by which the file has been encoded.

Since the access managing server performs the user verification collectively, it is possible to manage access attempts of the user from the information terminal to each managing server, under centralized control by the access managing server. Further, with the secure server, it is possible to guarantee a safe transmission of the above-mentioned minimum confidential information from the information terminal to the access managing server.

Furthermore, a new confidential information file or a confidential information file to which any change has been made, is encoded by encoding/decoding software before being uploaded to the confidential information managing server. That is, using the information terminal, it is possible to make some changes to the confidential information file stored in the confidential information managing server, and to store a new confidential information file in the confidential information managing server.

The confidential information management system and the information terminal of the present invention guarantee the following advantageous results:

(1) Since confidential information files containing various confidential information or confidential executing programs, which files are securely stored in the present system, are obtained in a safe manner anywhere at any time using a minimum of confidential information, it is possible to free a user from memorizing or taking notes of numerous passwords or personal identification codes, thereby resolving various problems relevant to the managing and the securing of the confidential information files. And also, even if such passwords or personal identification codes are made up of a string of characters that is difficult to memorize, it is possible to obtain the passwords or the personal identification codes in a safe manner anywhere at any time, as well as to store the passwords or the personal identification codes securely. The use of easy passwords or personal identification codes vulnerable to abuse can thus be prevented, thereby significantly improving the security level of a user verification system that employs password verification. Accordingly, the present invention provides an effective and secure use of a general type of password verification, without using a single-sign-on system or other system, nor making any changes to existing user verification infrastructures.

(2) Since such a confidential information file is an encoded file, it cannot be decoded without using a type of decoding software corresponding to the encoding software with which the file has been encoded. It is thus possible to prevent server administrators from misusing confidential information files, and also, even if a confidential information file should be intercepted or leaked, a third party (unauthorized user) cannot see the contents of the confidential information file, thereby guaranteeing a high level of security.

(3) Since the confidential information files are encoded, the security of a one-to-one communication between the confidential information managing server and the information terminal can be retained, thus facilitating the construction of confidential information managing servers and confidential information systems that require a high level of security.

(4) Since the encoding/decoding software can be downloaded from a dedicated purpose server, it is possible for the user to view and make changes to the confidential information file in a safe manner even when accessing from an information terminal which is authorized to any other user.

(5) Since the confidential information files containing passwords and personal identification codes can be obtained anywhere at any time, it is possible to significantly reduce the maintenance cost of the systems in which the password verification is employed.

(6) Since, if applied to systems employing PKI verification, the present invention surely prevents encryption keys for PKI (Public Key Infrastructure) from being made invalid due to inadvertent handling, it is possible to prevent a list of invalid digital certificates from becoming too big.

(7) Since a confidential information file is transmitted between each information terminal and a confidential information managing server, which are connected in a one-to-one relationship, it is possible to employ biometric information-utilized user verification with ease to verify users who intend to access a confidential information file stored in the server. Further, user verification using two or more types of biometric information is also facilitated.

(8) Since the access managing server performs user verification collectively, it is possible to manage access attempts by the user from the information terminal to each managing server, under centralized control by the access managing server. Each managing server is thus freed from making user verification separately, thereby simplifying the processing carried out by each managing server.

(9) Since the use of the secure server guarantees the security of the above-mentioned minimal confidential information, which is transmitted from the information terminal to the access managing server, an improved security level is realized in the confidential information managing system.

(10) When a new confidential information file or a confidential information file to which any change has been made is uploaded to the confidential information managing server, such a file is encoded by encoding/decoding software on the information terminal before being transmitted to the confidential information managing server and stored therein. It is thus possible to realize a sufficient level of security of the confidential information even if communication between the confidential information managing server and the information terminal does not comply with the security features of SSL (Secure Sockets Layer). Thus, mobile telephones commonly distributed in the market can serve as the information terminals of the present invention.

(11) Since the information terminal has a display on which the contents of a decoded confidential information file are to be shown, the user can view the contents immediately. At that time, since both a computer system name and the confidential information associated with the computer system name are shown on the display, it is possible to input required information to a computer system whose name is identical with the computer system name shown on the display.

(12) Partly since only computer system names are shown on the display, and partly since the confidential information associated with an object computer system name is sent, responsive to a predetermined operation made by the user, to a computer system whose name is identical with the object computer system name shown on the display, the confidential information itself is no longer shown on the display, thereby further improving the security of the confidential information. At the same time, since the user is freed from inputting the confidential information, user operation is simplified and the unscrupulous viewing and abuse by third parties of confidential information input by the user is prevented.

(13) Since with the lapse of a predetermined time after completion of the decoding of the confidential information file, the decoded confidential information file is deleted on the information terminal, there is no possibility of the confidential information file held in the information terminal being stolen by a third party, thereby guaranteeing improved security of the confidential information file.

(14) Since the contents of the decoded confidential information file stored in storage means are shown on the display upon completion of the user verification made by verifying means of the information terminal, the contents of the confidential information file can be securely stored in the storage means of the information terminal, while only an authorized user is allowed to view the contents shown on the display.

(15) Since upon the decoding of the confidential information file a program contained in the decoded confidential information file is executed on the information terminal, it is possible for the information terminal to automatically move to the operation instructed by the program.

(16) Since a radio token, which is carried by the user, wirelessly communicates with the information terminal periodically so that the decoded confidential information file is deleted on the information terminal unless the information terminal receives a periodic response from the radio token, it is possible to delete the confidential information file on the information terminal if the user with the radio token is separated from the information terminal, or if the terminal is stolen from the user, thereby preventing the confidential information file from being stolen by a third party and thus guaranteeing improved security of the confidential information file.

(17) Since the radio token holds information relevant to an encryption key needed for decoding the confidential information file, and sends the information to the information terminal on a request from the information terminal, only the user who carries the radio token can decode the confidential information file with use of encoding/decoding software, and it is no longer needed to take notes of the information with respect to an encryption key nor to store such information in a memory of any information device.

(18) Since the radio token is activated in response to the user verification with a password on the information terminal, it is possible to securely store the information with respect to the encryption key in the radio token.

(19) Since the encryption key, needed for decoding the confidential information file, is generated from a predetermined text password that is input to the information terminal by an authorized user, it is possible to input the encryption key to the information terminal as a kind of password.

(20) Since the information terminal includes an interface to an external storage medium that holds information relevant to an encryption key for decoding the confidential information file, it is possible to input the encryption key-relevant information from the external storage medium to the information terminal via the interface. This frees the user from inputting the encryption key-relevant information by herself/himself, thereby simplifying user operation, and also preventing encryption key-relevant information input by the user from being unscrupulously looked at and abused by a third party.

(21) Since the information terminal downloads a suitable one of the plural types of encoding/decoding software at a fixed time interval, and periodically alters an encoding system currently used in the confidential information file stored in the confidential information managing server into another encoding system that is offered by the downloaded encoding/decoding software, it is possible to guarantee an improved level of security of the confidential information file.

(22) Since the user obtains identification (ID) information and a password, which authorize the user to access the confidential information management system, by purchasing a prepaid card, it is possible to protect the user's anonymity regarding the confidential information management system. That is, it cannot be identified which one of the files stored in the confidential information managing server belongs to whom, thereby surely preventing misuse of such confidential information files. Moreover, prepaid cards are convenient to collect charges for use of the confidential information management system, in advance, at the time of issuance of ID information and passwords.

(23) Since each of the information terminals is a mobile telephone connectable to the Internet, it is possible to download a confidential information file anywhere at any time over the Internet. At that time, if the subscriber number of the mobile telephone is used as the ID information of the user, it is possible to employ a call-back system common to mobile telephones for verifying the user.

(24) Since the information terminal includes sampling means for sampling biometric information of the user for use in verifying the user, it is no longer necessary for the user to input a password to download a confidential information file, and the security level of the confidential information file is improved.

(25) Partly since user verification using biometric information is performed on the information terminal, and partly since the information relevant to an encryption key needed for decoding the confidential information file and the information needed for verifying the user are read out from storage means of the information terminal upon completion of the user verification, it is possible to store and manage such information securely on the information terminal. At that time, since biometric user verification can be carried out separately for individual users (for each information terminal), it is possible to employ the biometric user verification without making any changes to existing user verification infrastructures. And also, since the type of biometric information to be used in the verification is selected by the user on his/her own, that most convenient to the user can be selected.

Other objects and further features of the present invention will be apparent from the following detailed description when read in conjunction with the accompanying drawings.

DESCRIPTION OF THE PREFERRED EMBODIMENT(S)

Figure 1:
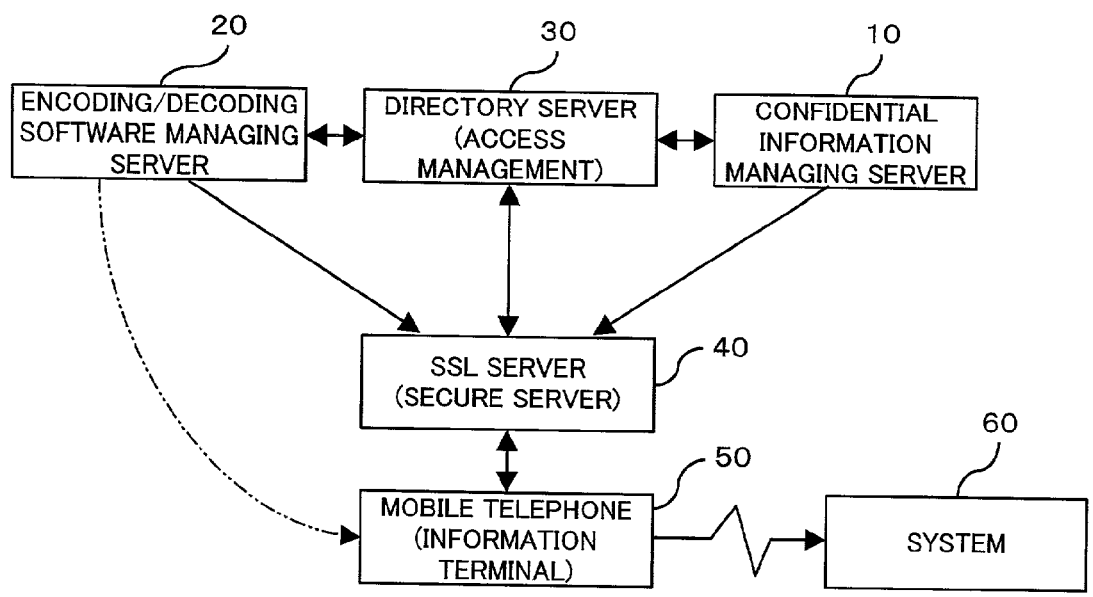
FIG. 1 is a block diagram schematically showing a confidential information management system of one embodiment of the present invention.

Today's widespread use of mobile telephones that are connectable with the Internet, such as i-mode (a trademark and/or service mark owned by NTT DoCoMo), has been realizing a personal, portable network environment. As a result, it has been becoming common for the user, if needing any information, to fetch such information (onto a mobile phone, etc.), over a network, from a 24-hour working server that is located anywhere, and not to store the information in a memory of an information terminal. A train schedule providing service via i-mode would be a good example.

In view of this, the confidential information managing system of the present invention includes a server for storing confidential information files, which server guarantees a secure communication environment, as well as utilizes the above-mentioned network environment, thereby enabling a user to obtain a confidential information file anywhere at any time using a minimum of confidential information.

In this embodiment, a description will be made of an example where information terminals are mobile telephones, and confidential information contained in a confidential information file includes an encryption key for PKI (Public Key Infrastructure) a digital certificate, or a program such as a confidential execution program, as well as the information to be used in user verification such as computer system names, IDs, passwords, and personal identification codes. At that time, the confidential execution program is a type of software for connecting a mobile telephone with a security server (reference character 90 of FIG. 8), which executes particular processing for decoding an encoded confidential information file having been downloaded to the mobile telephone so that the contents of the file are viewed by the user.

In this manner, according to the present invention, it is no longer necessary for the user to remember or store in a mobile telephone memory such information as computer system names, IDs, and passwords (personal identification codes) as these can be stored in an encoded form in a 24-hour working server located anywhere. Then, if needing the information anywhere at any time, it is possible for the user to retrieve it from the server onto a mobile phone. At the same time, since the software for encoding/decoding the confidential information is downloaded from another server to the mobile telephone, it is possible to encode/decode the confidential information on the mobile telephone anywhere at any time.

As a result, even in case of forgetting an ID or a password, the user can still obtain it through a personal identification number answering service with a mobile telephone.

Although there still remain a single ID and a couple of passwords to be memorized, it is possible for the user, merely by memorizing or storing those ID and passwords as a minimum of confidential information, to obtain various IDs and passwords (personal identification codes) recorded in a confidential information file which is stored in a safe manner. Here, the above-mentioned single ID and one of the passwords are used in the user verification on the server side, while the other one of the passwords is relevant to an encryption key for use in encoding/decoding the confidential information file.

As will be described later, instead of verifying the user on the server side by using the ID and the password, the user verification can be performed on the mobile telephone side by using biometric information. This makes it possible for the user to select what type of biometric information to use.

It is also possible, as will also be described later, to send the password and the ID, contained in the down loaded confidential information file, from the mobile telephone to various devices and computer systems via a radio interface (Bluetooth™, etc.) for logging-in to such devices and systems.

Further, a radio token, which is carried by the user, is prepared as a separate device for activating a password transmitting function of the mobile telephone. If the user (radio token) moves away from the mobile telephone so that it receives no response from the token, the confidential information file temporally held on the mobile telephone is deleted. Alternatively, with the lapse of a predetermined period, the downloaded confidential information file can be deleted automatically.

One preferred embodiment of the present invention will now be described with reference to the relevant accompanying drawings.

[1] Construction and function of the confidential information management system of the present embodiment:

A description will be made on the construction and the function of a confidential information management system according to the present embodiment, with reference to FIG. 1. FIG. 1 shows a schematic of the confidential information management system. It includes a confidential information managing server 10, an encoding/decoding software managing server 20, a directory server 30, an SSL server 40, and a mobile telephone 50.

The confidential information managing server 10 stores and manages confidential information files, which contain various confidential information and/or confidential execution programs, each in an encoded form, encoded with use of predetermined encoding software and a predetermined encryption key.

The encoding/decoding software managing server 20 stores and manages the encoding/decoding software which is used in encoding/decoding the confidential information files.

The directory server (access managing server) 30 manages access attempts of a user from the mobile telephone 50 to both the confidential information managing server 10 and the encoding/decoding software managing server 20 by verifying the user. After verifying the user based on the information received from the mobile telephone 50, the directory server 30 allows the user to access the confidential information managing server 10 or the encoding/decoding software managing server 20.

The SSL server 40 functions as a secure server for providing a secure environment in communications between the mobile telephone 50 and the confidential information managing server 10, the encoding/decoding software managing server 20, and the directory server 30. In this instance, at the transmission of the information (ID, password, or biometric information) to be used in user verification by the directory server 30, from the mobile telephone 50 to the directory server 30, the SSL server 40 prevents the information from being revealed so that the security of the information is guaranteed, and therefore the SSL server 40 may be disposed at least between the directory server 30 and the mobile telephone 50.

The mobile telephone (information terminal) 50 is capable of having access to both the confidential information managing server 10 and the encoding/decoding software managing server 20 via a communications network (the Internet, etc.) and the SSL server 40, and has an environment in which the encoding/decoding software is operated. A detailed description of the mobile telephone 50 will be made later with reference to FIG. 2.

As will be described later with reference to FIG. 3 through FIG. 9, upon an access attempt of a user from the mobile telephone 50, the directory server 30 verifies the user, and a confidential information file and encoding/decoding software are then downloaded from the confidential information managing server 10 and the encoding/decoding software managing server 20, respectively, via a communications network and the SSL server 40. After that, the mobile telephone 50 decodes the downloaded confidential information file by using predetermined decoding software and a predetermined encryption key. Here, the encoding/decoding software can be directly downloaded to the mobile telephone 50, without passing though the SSL server 40, or without being protected by SSL (indicated with a double dots-dash line in FIG. 1), if the user so wishes.

If any change or addition has been made to the contents of the encoded confidential information file on the mobile telephone 50 (see FIG. 9), or if a new confidential information file is intended to be stored in the confidential information managing server 10 from the mobile telephone 50 (see FIG. 10 through FIG. 16), such a file is encoded by predetermined encoding software and a predetermined encryption key on the mobile telephone 50 before being uploaded to the confidential information managing server 10 via a communications network and the SSL server 40.

Further, the encoding/decoding software managing server 20 stores more than one type of encoding/decoding software so as to be downloaded to the information terminal 50. The information terminal 50 downloads a suitable one of such plural types of encoding/decoding software at a fixed time interval, and alters an encoding system currently used in the confidential information file stored in the confidential information managing server 10 into another encoding system that is offered by the downloaded encoding/decoding software.

In this manner, such plural types of encoding/decoding software improve the security level of the present confidential information management system. Each user can use plural types of encoding/decoding software, and such encoding/decoding software can be stored in advance in a storage unit 53 of the mobile telephone 50.

As a matter of course, the encoding/decoding software downloaded from the encoding/decoding software managing server 20 to the mobile telephone 50 corresponds to the encoding software that was used in encoding the confidential information file at its storing in the confidential information managing server 10.

In the present embodiment, a set of encoding software and decoding software is called "encoding/decoding software". If any change has been made to the downloaded confidential information file on the mobile telephone 50, the confidential information file needs to be encoded by encoding software. A piece of encoding software and a piece of decoding software are thus downloaded in combination, from the encoding/decoding software managing server 20 to the mobile telephone 50.

As will be described later, the system (computer system) 60 of FIG. 1, which is communicably connected with the mobile telephone 50, receives an ID and a password (personal identification code) contained in the confidential information file that was encoded on the mobile telephone 50.

Further, the user purchases a prepaid card, and thereby obtains the information for use in the user verification performed by the directory server 30. Specifically, at an initial contraction with a service (confidential information managing service) for providing the confidential information management system of the present embodiment, the user purchases a prepaid card and is given, in exchange, identification (ID) information and a password, both of which will authorize the user to access the confidential information management system. The anonymity of the user is thus protected.

In this instance, the user may otherwise obtain the user verification information required by the directory server 30 without purchasing the prepaid card at the initial contract. In this case, charges for the service may be paid into a bank account based on an anonymous contract.

Figure 2:
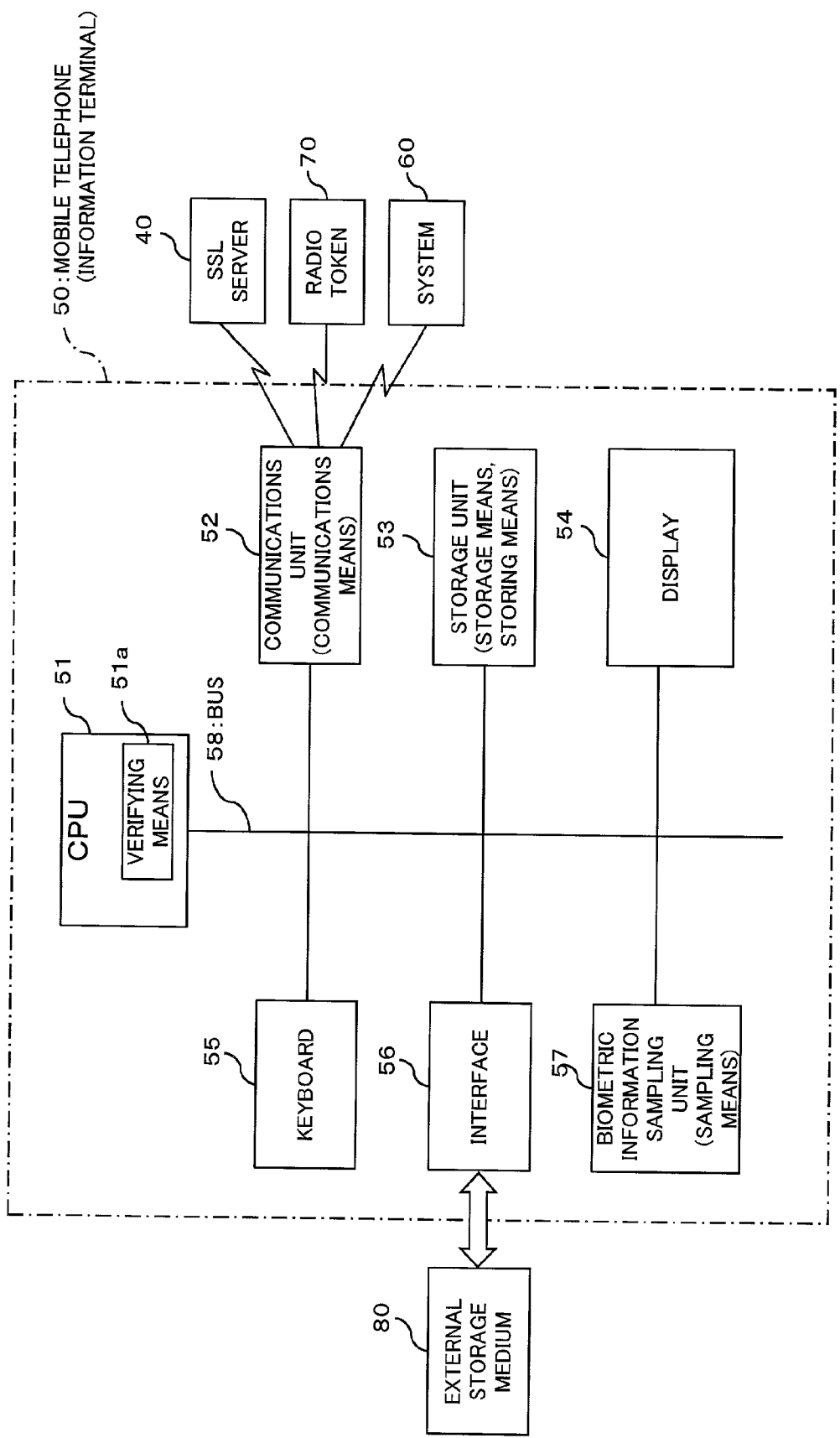
FIG. 2 is a block diagram schematically showing an information terminal (mobile telephone) of one embodiment of the present invention.

[2] Construction and function of the mobile telephone (information terminal) of the present embodiment:

A description will now be made on the construction and the function of the mobile telephone (information terminal) 50 according to the present embodiment, with reference to FIG. 2. FIG. 2 shows a schematic of the mobile telephone 50, which includes a CPU 51, a communications unit 52, a storage unit 53, a display 54, a keyboard 55, an interface 56, and a biometric information sampling unit 57. The mobile telephone 50 is communicably interconnected with the CPU 51 and the other elements 52 through 57 via a bus 58.

Here, the mobile telephone 50 stores a confidential information managing application for creating and changing a confidential information file, which application has been previously downloaded onto the mobile telephone 50. The confidential information managing application may always be stored in the storage unit 53, but with consideration paid to the capacity of the storage unit 53, the application may otherwise be downloaded to the mobile telephone 50 when needed, as will be described later with reference to FIG. 12 through FIG. 15.

The mobile telephone 50, being part of the confidential information management system of the present invention, at least includes the CPU 51, the communications unit 52, the storage unit 53, the display 54, and the keyboard 55. In the present embodiment, the mobile telephone 50 further includes the interface 56 and the biometric information sampling unit 57 for the purpose of accomplishing various features as will be described later.

The CPU 51 manages and controls the operation of each of the above elements 52 through 57, constituting the mobile telephone 50, in a collective way. It also serves as a verifying means 51a for verifying the user with use of a password or biometric information as required. Moreover, the CPU 51 encodes/decodes the confidential information file with the use of a predetermined encryption key and encoding/decoding software downloaded to the mobile telephone 50.

The communications unit (communications means) 52 communicates with external apparatus, transmitting/receiving various signals and data. In the present embodiment, the communications unit 52 not only serves as a handset of a mobile telephone and a mobile terminal for an Internet connection, but also carries the following functions (a1) through (a3):

(a1) a communications function for communicating with the SSL server 40, transmitting/receiving various signals and data. This is actually realized by the above-mentioned Internet connection function.

(a2) an interface function for communicating with the system 60 and various devices in a wireless (Bluetooth™, etc.) or a wired manner. In the transmission and receipt of various signals and data with the system 60, the above Internet connection function will be also utilized.

(a3) a communications function for communicating with a radio token 70 (described later), transmitting/receiving various signals and data.

The storage unit (recording means, storing means) 53, is prepared, in use, as a RAM, a ROM, or the like, for recording/storing various data and various programs. The storage unit 53 of the present embodiment not only stores a confidential information managing application, a confidential information file, and encoding/decoding software, having been downloaded to the mobile telephone 50, but also stores the following information (b1) through (b4) as necessary:

(b1) information for use in user verification (an ID and passwords);

(b2) information (an encryption key itself, or a text password for generating an encryption key; hereinafter will also be called "encryption key information") with respect to an encryption key needed in encoding/decoding the confidential information file;

(b3) the biometric information previously registered for use in its comparison with an object person's biometric information, in user verification carried out on the mobile telephone 50; and (b4) a registered local password (described later under item (d6)) for use in user verification at the reading-out of a confidential information file from the storage unit 53. The password for use in user verification, described in the above item (b1) can serve as the registered local password.

If the keyboard 55 (described later) is used to input an ID and a password at the user verification, it is unnecessary to store the information (b1) in the storage unit 53. If the encryption key information is obtained from the keyboard 55, the radio token 70, or an external storage medium 80, each to be described later, it is unnecessary to store the encryption key information (b2) in the storage unit 53. And, unless the biometric user verification is carried out on the mobile telephone 50, it is inevitably unnecessary to store the biometric information (b3) in the storage unit 53.

The display 54, which is, say, a liquid crystal display, shows various data on its screen.

The keyboard 55 is for inputting numeral data and character data therethrough, just like those equipped to common types of mobile telephones. The keyboard 55 is used, as needed, to input the following information (c1) through (c4):

(c1) the information for use in user verification (an ID and passwords);

(c2) the encryption key information for use in encoding/decoding the confidential information file;

(c3) a local password (described later under item (d6)) for use in user verification at the reading-out of the confidential information file from the storage unit 53; and (c4) a password for activating the radio token 70, as will be described under item (e3).

Here, the password for use in the user verification described in the above item (b1) and (c1), can serve as the passwords of the above item (c3) and (c4).

The interface 56 transfers data between the mobile telephone 50 and the external storage medium (auxiliary storage medium) 80, which is, in use, an IC card or a Smart Media, etc. In the present embodiment, the interface 56 is used for putting the information relevant to an encryption key (an encryption key itself, or a text password for generating an encryption key), which information has previously been stored in the external storage medium 80, into the CPU 51. In this instance, if the external storage medium 80 is an IC card, the interface 56 may be either one of a contact type and a non-contact type; the former contacts with an IC card terminal for data transfer while the latter transfers the data in wireless.

Figure 4:
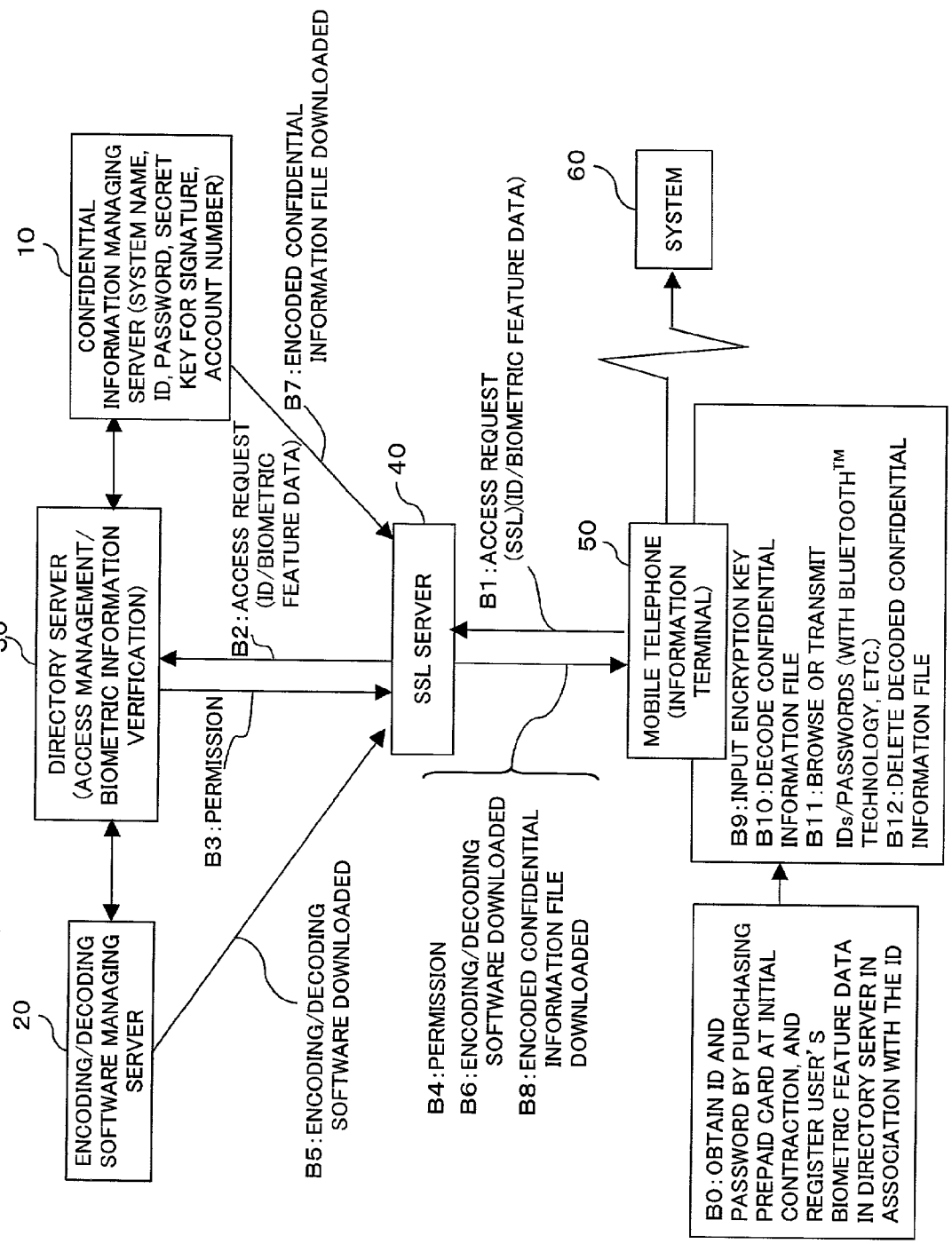
FIG. 4 is a diagram illustrating a second example of the procedure for downloading confidential information in the confidential information management system of the present embodiment.

The biometric information sampling unit (sampling means) 57 samples an object person's biometric information (physical characteristics such as fingerprint, palmprint, finger shape, hand shape, voiceprint, retina, iris, facial recognition, signature dynamics, blood vessel pattern, and key strokes, etc.), which is unique to the object person, when biometric user verification is performed by the verifying means 51a of the mobile telephone 50 (see FIG. 5), or by the directory server 30 (see FIG. 4). At that time, the CPU 51 also extracts biometric feature information from the sampled biometric information, for use in verifying the user.

If the biometric information to be sampled is a fingerprint image, a fingerprint scanner is employed to serve as the biometric information sampling unit 57. In use, there are such examples in the market as a CCD camera which takes a picture image of a fingertip while its being touched with a special optical system, and a capacitance sensor which detects only protuberant parts of the fingertip skin. At that time, as the biometric feature information, the CPU 51 extracts minutiae of the fingerprint ridges, namely, ridge dividing points and ridge end points, from the fingerprint image.

Figure 3:
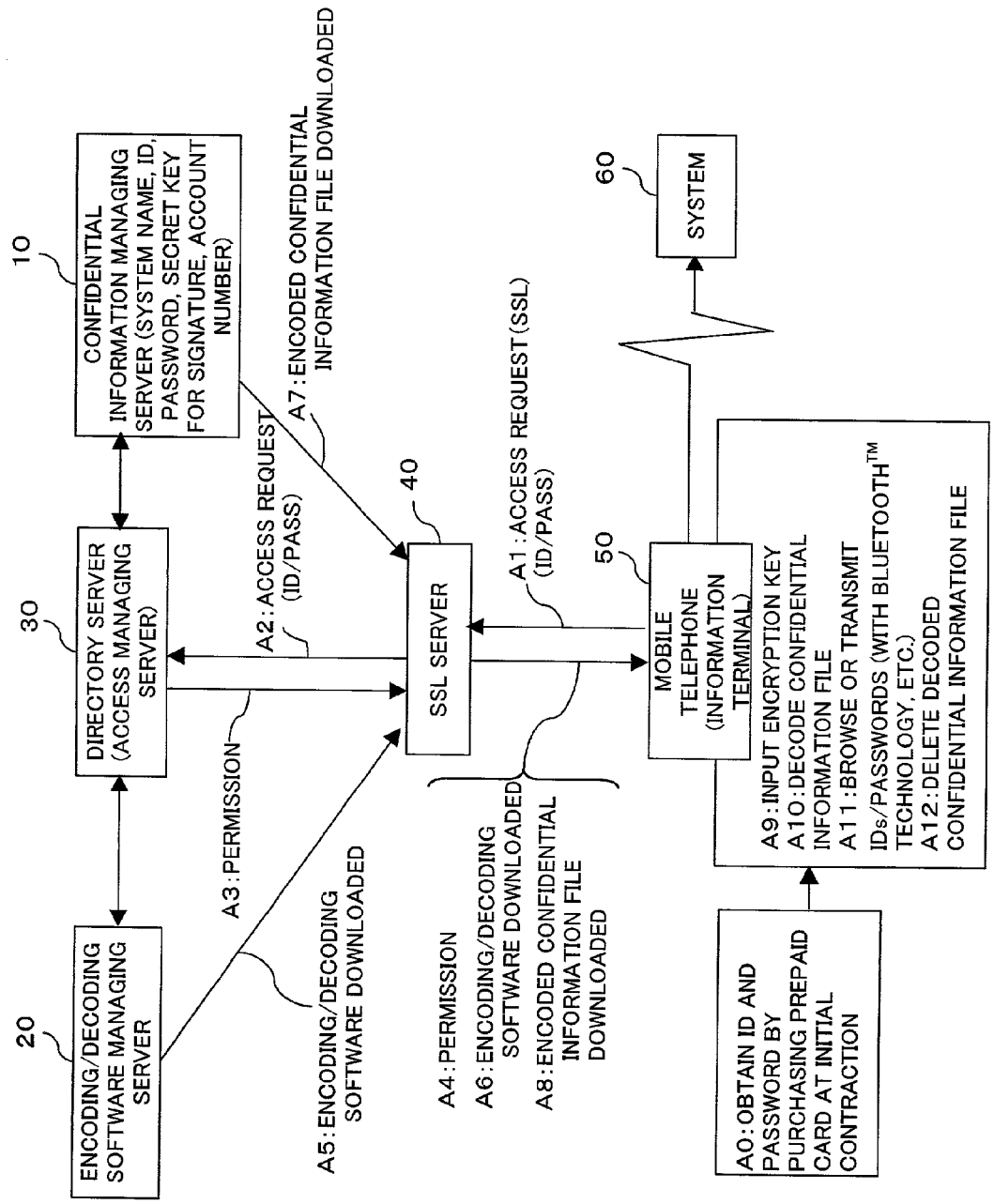
FIG. 3 is a diagram illustrating a first example of a procedure for downloading confidential information in the confidential information management system of the present embodiment.
Figure 6:
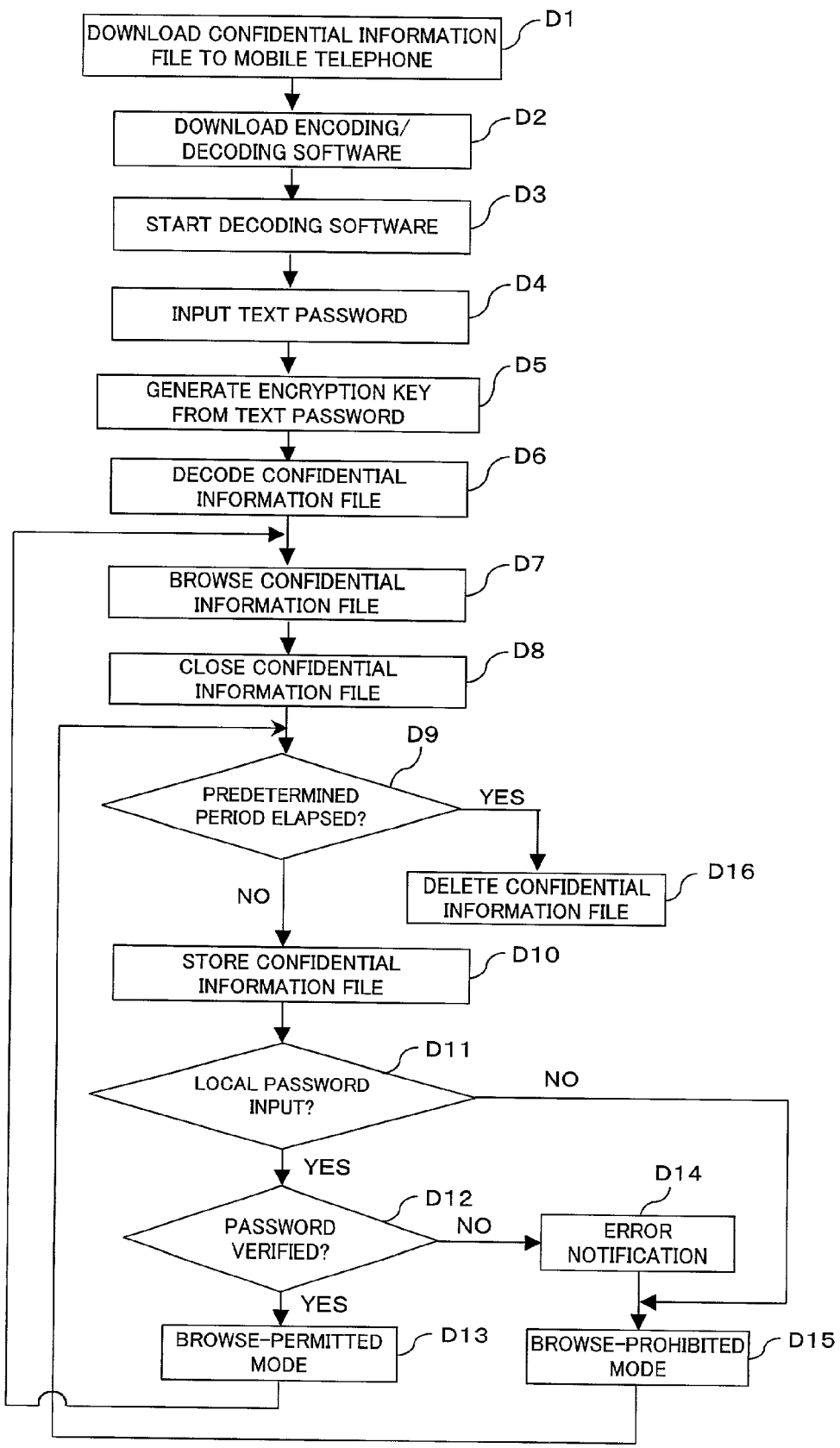
FIG. 6 is a flowchart showing a second example of the procedure to be executed by a mobile telephone at the downloading of a confidential information file in the present embodiment.
Figure 8:
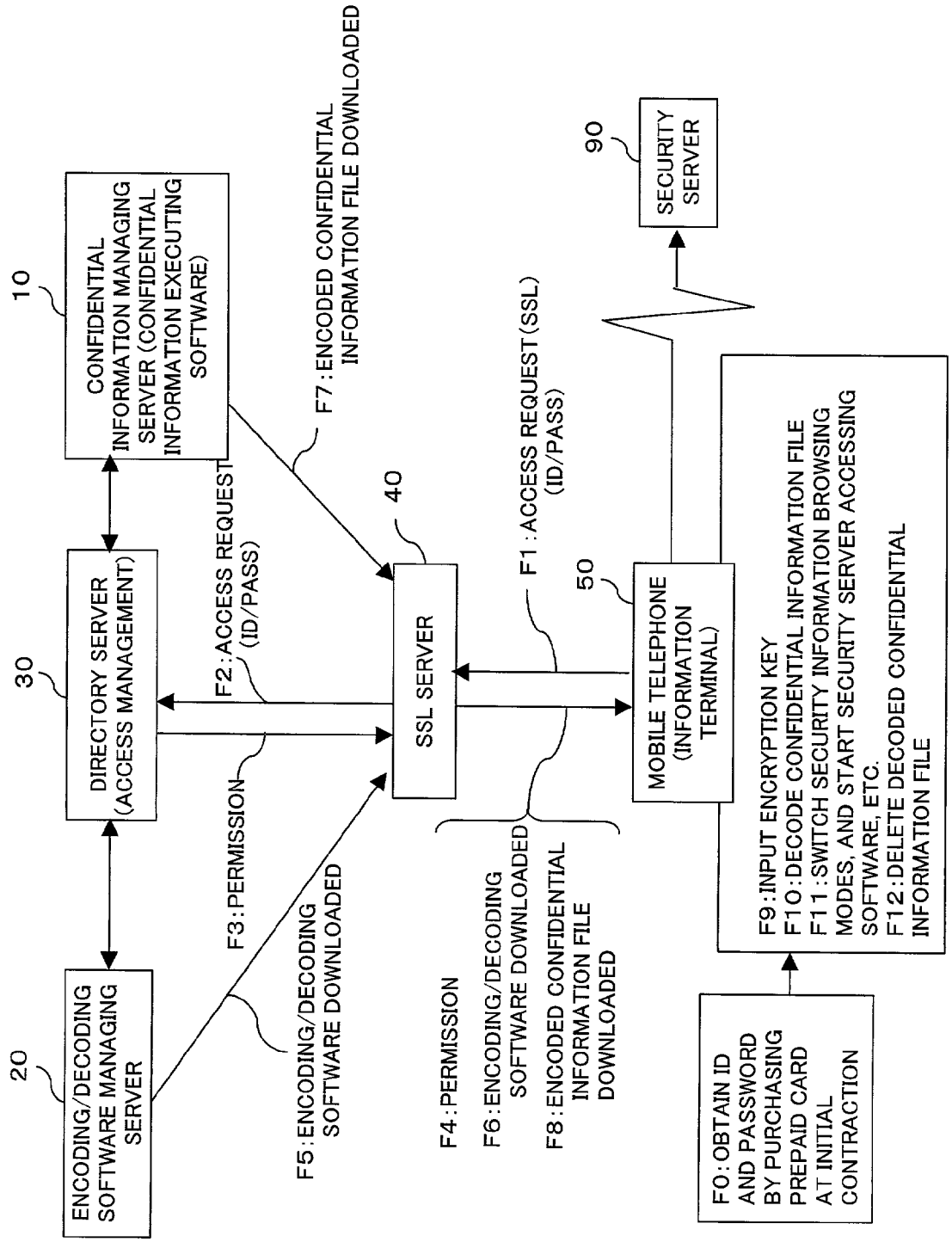
FIG. 8 is a diagram showing a third example of the procedure for downloading confidential information in the confidential information management system of the present embodiment.

In the above-described mobile telephone 50, the contents of a confidential information file which was downloaded from the confidential information managing server 10 and then encoded, is treated in the following manner (d1) through (d6):

(d1) the CPU 51 instructs the display 54 to show on its screen the contents of the confidential information file as they are (FIG. 3 and FIG. 4);

(d2) if a program (say, a confidential execution program) is included in the confidential information file, the CPU 51 automatically executes the program (FIG. 8);

(d3) the CPU 51 instructs the display 54 to show both system names (computer system names) and the confidential information associated with the system names, as the contents of the confidential information file (FIG. 3 and FIG. 4). Here, in concrete, the computer system names includes bank names, credit company names, and various device names; the system name-associated confidential information includes various IDs, such as account numbers, credit card numbers, and various device numbers, as well as IDs and personal identification codes (passwords) corresponding to the account numbers and the credit card numbers, and passwords having previously been set for the devices;

(d4) the CPU 51 instructs the display 54 to show only the system names on its screen as the contents of the confidential information file. In response to a predetermined operation made by the user through the keyboard 55, the CPU 51 instructs the communications unit 52 to transmit the confidential information (ID, password, or personal identification code) associated with an object system name, to a system whose name is identical with the object system name (namely, a server of a predetermined bank or a credit company, or a predetermined device itself) (FIG. 3 and FIG. 4). At this transmission, the interface function of the above item (a2), for example, can be utilized;

(d5) with lapse of a predetermined time after the decoding of the confidential information file, the CPU 51 deletes the confidential information file from the storage unit 53 (FIG. 6); and (d6) the contents of the decoded confidential information file is stored in the storage unit 53, and upon completion of the user verification (using a local password or biometric information, etc.) by the verifying means 51a (realized by the CPU 51), the CPU 51 reads out the contents of the confidential information file stored in the storage unit 53 and then instructs the display 54 to show the readout information on its screen (FIG. 6).

Figure 7:
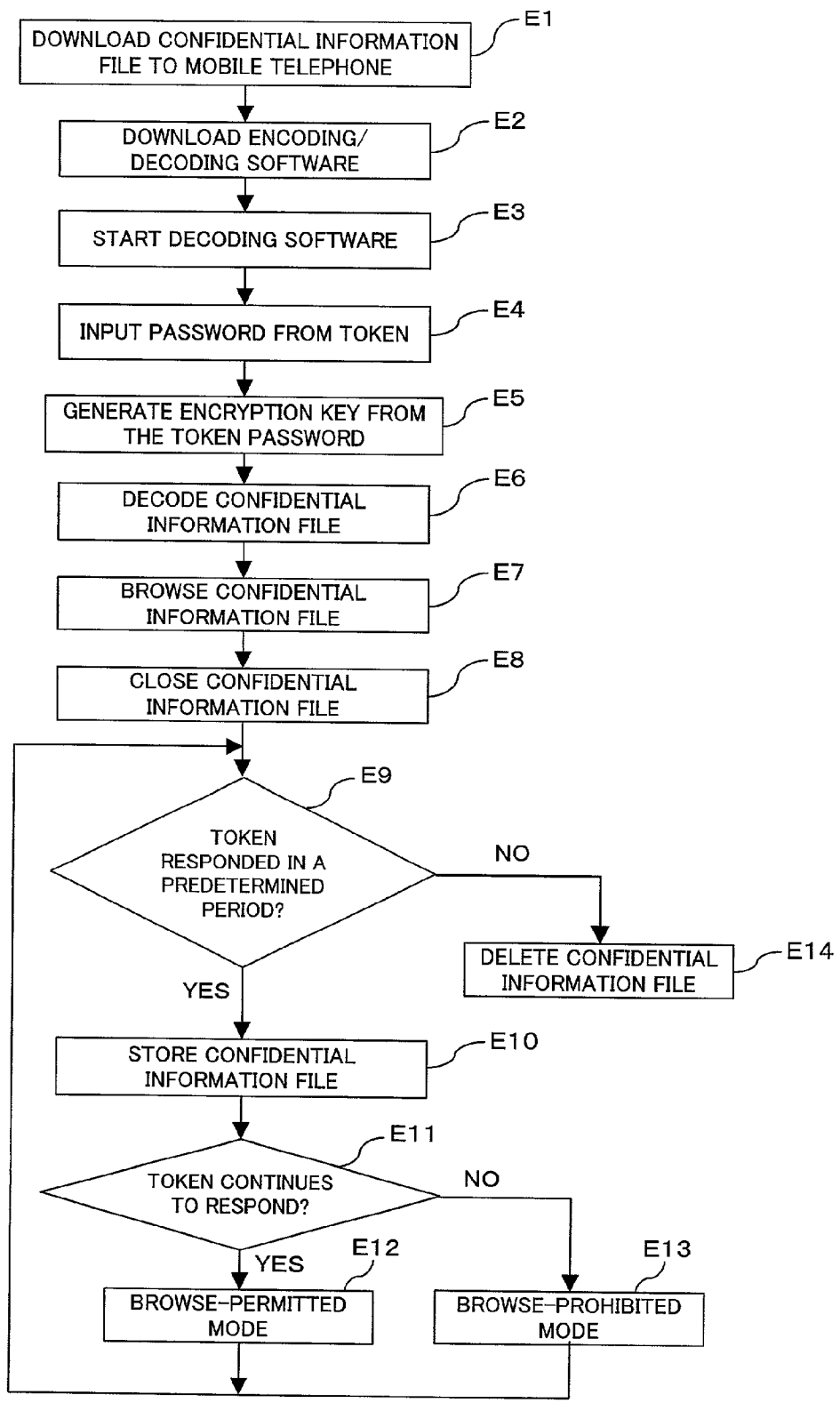
FIG. 7 is a flowchart showing a third example of the procedure to be executed by a mobile telephone at the downloading of a confidential information file in the present embodiment.

In the meantime, in the confidential information management system of the present embodiment, with a radio token 70 which is carried by the user, for wirelessly communicating with the mobile telephone 50 periodically, the following (e1) through (e4) are accomplished:

(e1) the CPU 51 monitors periodical responses from the radio token 70 so that the confidential information file stored in the storage unit 53 is deleted unless the mobile telephone 50 receives a periodic response from the radio token 70. That is, the above functions (d1) through (d4) (the information contents display function of the display 54 and the password transmitting function of the mobile telephone 50, etc.) are activated by response signals periodically received from the radio token 70 (FIG. 7);

(e2) the radio token 70 previously holds encryption key information for use in decoding the confidential information file, and it also includes a function of transmitting the encryption key information to the mobile telephone 50, responsive to its request. When decoding the confidential information file, the mobile telephone 50 receives the encryption key information from the radio token 70 (FIG. 7);

(e3) the radio token 70 of the item (e2) is activated upon completion of the password verification performed on the mobile telephone 50. More precisely, if a predetermined password (the password mentioned in item (c4)) is input from the keyboard 55 so as to activate the radio token 70, the verifying means 51a of the CPU 51 compares the input password with that (included in the above information (b1)) stored in the storage unit 53. If the two are found to be identical, the CPU 51 instructs the communications unit 52 to send a predetermined signal to the radio token 70 thereby activating the radio token 70 so as to send the above-mentioned encryption key information to the mobile telephone 50; and (e4) the mobile telephone 50 is given a unique ID number, while the radio token 70 of item (e2) has a function of recognizing only this ID number. If an ID number the radio token 70 obtained during the communication with any mobile telephone 50 is found to be identical with the above unique ID number, the radio token 70 transmits the above encryption key information to the mobile telephone 50.

The encryption key information (an encryption key itself, or a text password for generating an encryption key) for use in decoding the confidential information file, is input to the mobile telephone 50 (CPU 51) in ways described hereinbelow ((f1) through (f6)):

(f1) the user manually inputs the encryption key through the keyboard 55;

(f2) the encryption key is converted into text so as to be input to the mobile telephone 50 (CPU 51), just like a password. In other words, in the CPU 51, decoding software generates an encryption key from a predetermined text password which was input from the keyboard 55 (FIG. 6);

(f3) if the external storage medium 80 is an auxiliary storage medium such as a smart medium, the encryption key is read out from the auxiliary storage medium inserted into the body of the mobile telephone 50. That is, the external storage medium 80 storing the encryption key information is mounted on the interface 56, via which interface 56 the encryption key information is read out and then input to the CPU 51;

(f4) in the above (f3), the encryption key information stored in the external storage medium 80 may be protected by a password. Like in the above item (e3), if a predetermined password (the password (c3)) is input from the keyboard 55 for reading out the encryption key information from the external storage medium 80, the verifying means 51*a* of the CPU 51 compares the input password with that (included in the information (b1)) stored in the storage unit 53. If the two are identical, the encryption key information is read out from the external storage medium 80 via the interface 56 and then input to the CPU 51;

(f5) if the external storage medium 80 is an IC card, the encryption key information is stored in the IC card. The encryption key information is read out from the IC card via the interface 56 in a non-contact manner or a contact manner, and then input to the CPU 51; and (f6) as described in the above items (e2) through (e4), the radio token 70 holds the encryption key information, and if the radio token 70 is located close enough to communicate with the mobile telephone 50, the encryption key information is wirelessly transmitted from the radio token 70 to the mobile telephone 50 via the communications unit 52 and then input to the CPU 51 (FIG. 7).

Figure 5:
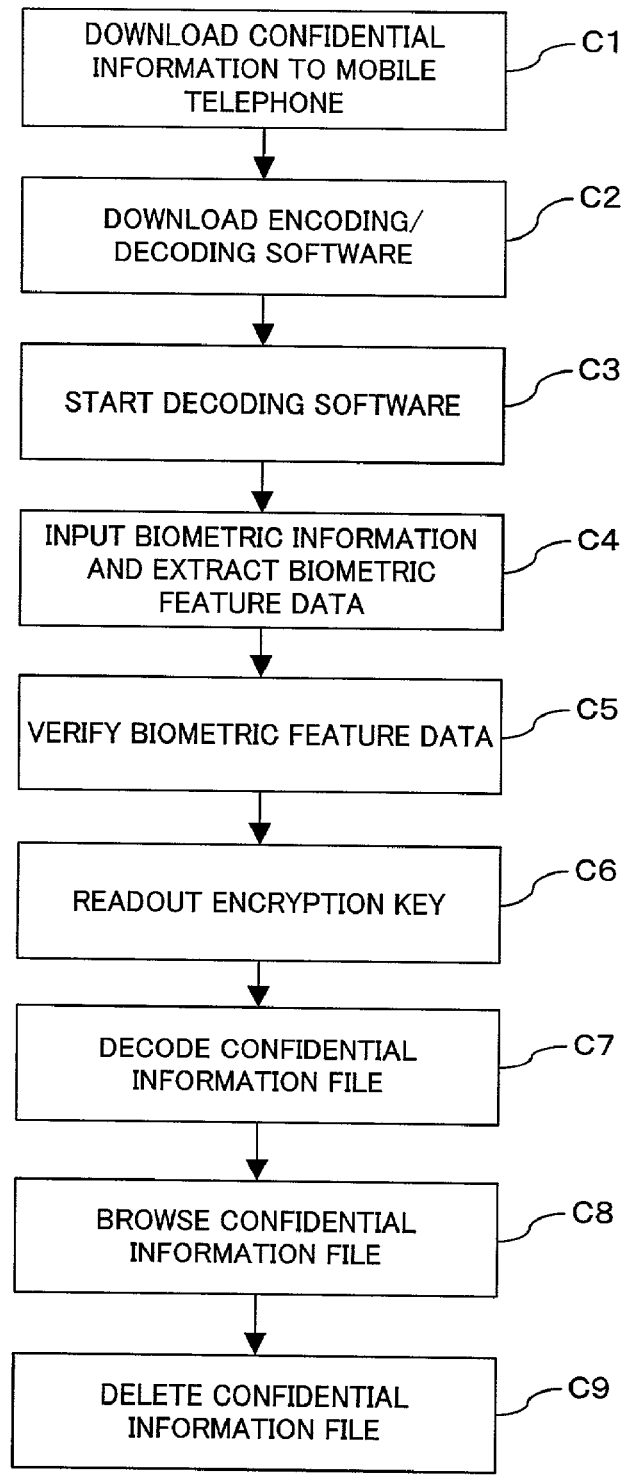
FIG. 5 is a flowchart showing a first example of a procedure to be executed by a mobile telephone at the downloading of a confidential information file in the present embodiment.

Further, in the confidential information management system of the present embodiment, with use of the mobile telephone 50 above described, the following features (g1) and (g2) are also attained:

(g1) the subscriber number of the mobile telephone 50, which number is notified by a caller ID service, etc., is used as the ID information of the user, and thereby the user verification can be carried out by utilizing a call-back system of the mobile telephone 50; and (g2) biometric user verification is performed on the mobile telephone 50, and upon completion of the verification, it becomes possible to read out the user verification information (b1) or the encryption key information (b2) stored in the storage unit 53, thereby guaranteeing the security of such information (b1) and (b2) in the storage unit 53. That is, the CPU 51 extracts biometric feature information from an object person's biometric information, which information is input by the biometric information sampling unit 57, and the verifying means 51*a* of the CPU 51 then compares the thus extracted biometric feature information with that (b3) stored in the storage unit 53. Upon completion of the user verification, the information (b1) and (b2) is read out from the storage unit 53 (FIG. 5).

[3] Various procedures performed by the confidential information management system and the mobile telephone of the present embodiment:

A description will now be made of various procedures performed by the confidential information management system and the mobile telephone 50 of the present embodiment, with reference to FIG. 3 through FIG. 15.

[3-1] First exemplary procedure for downloading confidential information:

FIG. 3 illustrates a first example of a procedure for downloading the confidential information in the confidential information management system of the present embodiment. This is a basic procedure (steps A0 through A12) for downloading the confidential information in the confidential information management system of FIG. 1.

In the beginning, a user purchases a prepaid card when initially making a contract with the confidential information management system, thereby obtaining an ID and a password for use in the user verification performed at access attempt to the confidential information management system (step A0) Using this ID and password, the user stores a confidential information file having been encoded (hereinafter also called "encoded confidential information file") to the confidential information managing server 10. The procedure for uploading/storing a new confidential information file to the confidential information managing server 10, will be described later with reference to FIG. 10 through FIG. 15. Here, the confidential information file records both system names (computer system names) and confidential information, such as IDs and passwords, in association with one another.

In order to view the contents of the confidential information file, the user makes an access request from the mobile telephone 50 to the directory server 30 via the Internet and the SSL server 40 (also via exchanges or else, in practical use) (step A1 and step A2). At that time, under a secure communication environment protected by the SSL server 40, the access request accompanied by the ID and the password ("PASS" in the drawings), which were provided at purchasing the prepaid card, is transmitted from the mobile telephone 50 to the directory server 30, and thereby the mobile telephone 50 is permitted to log-in to the directory server 30.

The directory server 30 verifies the user based on the ID and the password received from the mobile telephone 50. Upon confirmation that the ID and the password are those issued to an existing prepaid card, and also that the amount left in the prepaid card is enough to pay a service charge (or management charge), the directory server 30 notifies the mobile telephone 50 of an access permission via the SSL server 40 (step A3 and step A4). At the same time, the permission issuance to the mobile telephone 50 is notified to the managing servers 10 and 20, which are under the control of the directory server 30.

Upon receipt of the access permission, the encoding/decoding software managing server 20 transfers encoding/decoding software of the same type as that used in encoding the confidential information file, to the mobile telephone 50 via the SSL server 40 (step A5 and step A6). At almost the same time, the encoded confidential information file is downloaded from the confidential information managing server 10 to the mobile telephone 50 via the SSL server 40 (step A7 and step A8).

After that, the decoding software is activated on the mobile telephone 50, and an encryption key is input following one of the above-described manners (f1) through (f6) (step A9). Using this decoding software and encryption key, the confidential information file having been downloaded in an encoded form is decoded on mobile telephone 50 (step A10) After completion of the decoding, the system names and the IDs/passwords are shown on the display 54 for the user's review with a compact browser, as previously described in items (d1) and (d3), or they are transmitted from the communications unit 52 to the system 60 (a bank server, an object device, etc.) with use of the radio communication function (Bluetooth™, etc.) (step A11), as described in item (d4).

After that, the decoded confidential information file is deleted, in view of its security, on the mobile telephone 50 (step A12). In this instance, the deletion may be manually operated by the user, or as described in item (d5), the confidential information file may otherwise be deleted from the storage unit 53 automatically with lapse of a predetermined period. Or else, as described in item (d6), the confidential information file may be held on mobile telephone 50 (storage unit 53) for a while, under access control with a local personal identification code. The downloading procedure to which the above item (d5) is applied will be described later with reference to FIG. 6.

[3-2] Second exemplary procedure for downloading confidential information:

FIG. 4 illustrates a second example of the procedure for downloading the confidential information in the confidential information management system of the present embodiment. The procedure (step B0 through step B12) of FIG. 4 is common to that of FIG. 3, with the exception that not a password but the biometric information is used in the user verification on the directory server 30.

A user purchases a prepaid card at initially making a contract with the confidential information management system, thereby obtaining an ID and a password for use in user verification at accessing the confidential information management system. In association with the ID, the user's biometric feature information is stored in the directory server 30 (step B0). Using this ID and biometric feature information, the user stores an encoded confidential information file to the confidential information managing server 10. As in the above first example, the confidential information file records both system names (computer system names) and confidential information, such as IDs and passwords, in association with one another.

In order to view the contents of the confidential information file, the user makes an access request from mobile telephone 50 to directory server 30 via the Internet and SSL server 40 (also via exchanges or else, in practical use) (step B1 and step B2).

At that time, on mobile telephone 50, the user inputs his/her biometric information (a fingerprint image, for example) through the biometric information sampling unit 57, and from this information the CPU 51 extracts biometric feature information (minutiae of fingerprint ridges, etc.). Under a secure communication environment protected by the SSL server, the access request accompanied by both the ID, which was provided at purchasing the prepaid card, and the CPU 51-extracted biometric feature information, is transmitted from the mobile telephone 50 to the directory server 30, and thereby the mobile telephone 50 is permitted to log-in to the directory server 30.

The directory server 30 verifies the user based on the ID and the biometric feature information, which are received from the mobile telephone 50. More precisely, upon receipt of the ID, the directory server 30 reads out the ID-associated biometric feature information having been previously stored therein. The directory server 30 then compares the thus readout biometric feature information with an object person's biometric feature information received from mobile telephone 50.

Upon confirmation that the biometric feature information received from the mobile telephone 50 is identical with an authorized user's, and also that the amount left on the prepaid card is enough to pay a service charge (or management charge), the directory server 30 notifies the mobile telephone 50 of an access permission via the SSL server 40 (step B3 and step B4). At the same time, the permission issuance to the mobile telephone 50 is notified to the confidential information managing server 10 and the encoding/decoding software managing server 20, which are under control of the directory server 30.

The procedure from step B5 through step B12 is the same as that from step A5 through step A12 of FIG. 3, so its detailed description is omitted here.

In the following items [3-3] through [3-5], a description will be made, with reference to FIG. 5 through FIG. 7, on the procedure (first, second, and third example) carried out on mobile telephone 50 onto which the confidential information file and the encoding/decoding software were downloaded following the procedure (step A0 through step A8 or step B0 through step B8) described above with reference to FIG. 3 and FIG. 4.

[3-3] First exemplary procedure executed on a mobile telephone for downloading confidential information:

In accordance with the flowchart (step C1 through step C9) of FIG. 5, a description will now be made on a first example of the procedure carried out on mobile telephone 50 for downloading the confidential information. Here, as described in item (g2), the encryption key has been stored in the storage unit 53, and is protected by the biometric information.

In such a case, when a confidential information file and encoding/decoding software are downloaded to the mobile telephone 50 (step C1 and step C2), the CPU 51 starts up the downloaded decoding software (step C3).

The user inputs his/her biometric information (a fingerprint image, for example) through the biometric information sampling unit 57, and from this information the CPU 51 extracts biometric feature information (minutiae of the fingerprint ridges, etc.) (step C4).

The verifying means 51a of the CPU 51 compares the biometric feature information thus extracted in step C4 with the biometric feature information which has previously been registered/stored in the storage unit 53 (see item (b3)), thereby verifying the user (step C5). As the result, an object person is decided to be an authorized user, an encryption key is readout from the storage unit 53 (step C6).

Using the encryption key thus read out in step C6, the decoding software, which has already been started up, decodes the encoded confidential information file (step C7).

Upon completion of the decoding, the contents of the decoded confidential information file are shown on the display 54. The user reviews the contents of the file using a compact browser or the like (step C8), and then the confidential information file is deleted on the mobile telephone 50 (step C9).

[3-4] Second exemplary procedure executed on a mobile telephone for downloading confidential information:

In accordance with the flowchart (step D1 through step D16) of FIG. 6, a description will now be made on a second example of the procedure, carried out on mobile telephone 50, for downloading the confidential information. In this example, an encryption key is input as a text password, and the above items (d5) and (d6) are also applied to.

In such a case, when the confidential information file and the encoding/decoding software are downloaded to mobile telephone 50 (step D1 and step D2), the CPU 51 starts up the downloaded decoding software (step D3), and then a text password (encryption key information) is input to the mobile telephone 50 following one of the above-described ways (f1) through (f5) (step D4).

After that, the decoding software generates an encryption key from the text password thus input in step D4 (step D5). Using this encryption key, the confidential information file is decoded (step D6)

Upon completion of the decoding, the contents of the decoded confidential information file are shown on the display 54. The user views the contents of the file using a compact browser or the like (step D7), and then the confidential information file is closed for the present and stored in the storage unit 53 (step D8). At this time, the confidential information file is protected by a local password; the mobile telephone 50 switches into a browse-prohibited mode, where no one is allowed to view the confidential information file unless the precise local password is input thereto.

After that, CPU 51 uses its timer function to measure an elapsed time period, and evaluates whether or not a predetermined time duration is elapsed (step D9). If the evaluation yields a negative result (NO route in step D9), the confidential information file still remains in the storage unit 53 (step D10).

If the local password (see item (c3)) is input through the keyboard 55 of the mobile telephone 50 (YES route in step D11) while the confidential information file is being stored in the storage unit 53, the verifying means 51*a* of the CPU 51 compares the local password with a user identification-dedicated local password (see item (b4)), which has previously been registered/stored in the storage unit 53, thereby carrying out the user verification (step D12).

As the result, an object person to be verified is an authorized user (YES route in step D12), mobile telephone 50 switches from the browse-prohibited mode to a browse-permitted mode (step D13), and then returns to step D7. Otherwise if it is decided that the object person is not an authorized user (NO route in step D12), the mobile telephone 50 shows an error notification (step D14) and maintains the browse-prohibited mode. The procedure then returns to step D9. In this instance, with no local password being input thereto (NO route in step D11), the mobile telephone 50 of course maintains the browse-prohibited mode (step D15) and returns to step D9.

Upon detection, by the CPU 51, of the lapse of a predetermined period (YES route of step D9), the confidential information file is deleted from the storage unit 53 (step D16).

[3-5] Third exemplary procedure executed on a mobile telephone for downloading confidential information:

In accordance with the flowchart (step E1 through step E14) of FIG. 7, a description will now be made on a third example of the procedure, carried out on the mobile telephone 50, for downloading the confidential information. In this example, an encryption key is input as a text password, and the above items (e1), (e2), and (f6) are also applied to.

In this case, when the confidential information file and the encoding/decoding software are downloaded to the mobile telephone 50 (step E1 and step E2), the CPU 51 starts up the downloaded decoding software (step E3), and then a text password (encryption key information) is input to the mobile telephone 50 following the above-described way (f6) (step E4). That is, the text password has previously been stored in the radio token 70, which is carried by the user, such that, if the mobile telephone 50 is close enough to communicate with the radio token 70, the encryption key information is wirelessly sent from the radio token 70 to the mobile telephone 50 through the communications unit 52 and then input to the CPU 51.

The decoding software then generates an encryption key from the text password, which is input in step E4 (step E5) Using this encryption key, the confidential information file is decoded (step E6) Upon completion of the decoding, the contents of the decoded confidential information file are shown on the display 54. The user views the contents of the file using a compact browser or the like (step E7), and then the confidential information file is closed for the present and stored in the storage unit 53 (step E8).

After that, the CPU 51 uses its timer function to monitor whether or not a response reaches from the radio token 70 within a predetermined period (step E9). If the monitoring yields a positive result (YES route in step E9), the confidential information still remains in the storage unit 53 (step E10).

While the confidential information file remains in the storage unit 53, the CPU 51 monitors whether or not a response reaches from the radio token 70 continuously (step E11). If the monitoring yields a positive result (YES route in step E11), the mobile telephone 50 moves into the browse-permitted mode (step E12), and then the procedure returns to step E9. Otherwise if the monitoring yields a negative result (NO route in step E11), the mobile telephone 50 moves into the browse-prohibited mode (step E13) and then the procedure returns to step E9.

In other words, while the confidential information file is being stored in the storage unit 53, the mobile telephone 50 switches into the browse-permitted mode if the radio token 70 and the mobile telephone 50 are close enough to communicate with one another. Otherwise the mobile telephone 50 switches into the browse-prohibited mode.

If an instruction to show the confidential information file is input during the browse-permitted mode, mobile telephone 50 moves to step E7.

And, if the CPU 51 recognizes that no response is received from radio token 70 in a predetermined period (NO route of step E9), the confidential information file is deleted in storage unit 53 (step E14). In other words, if radio token 70 stays outside an area where it is communicable with mobile telephone 50, for a predetermined period or longer, the confidential information file is deleted on mobile telephone 50.

[3-6] Third exemplary procedure for downloading confidential information:

FIG. 8 illustrates a third example of the procedure for downloading the confidential information in the confidential information management system of the present embodiment. The procedure (step F0 through step F12) of FIG. 8 is basically common to that of FIG. 3, and in this example, the confidential information file contains a confidential execution program (confidential information execution software, confidential information execution file) as well as the confidential information itself such as IDs and passwords.

The procedures of step F0 through step F12 are approximately the same as those of step A0 through step A12 of FIG. 3, respectively, with the exception of step F11.

In the example of FIG. 8, after the encoded confidential information file is decoded on the mobile telephone 50 following the step F0 through F10 (step A0 through A10 of FIG. 3), mobile telephone 50 is switched into a confidential information browse-permitted mode, and CPU 51 starts up a confidential information execution program, or the access software to the security server 90 (step F11) After that, as in step A12 of FIG. 3, the confidential information file is deleted for security on mobile telephone 50 (step F12).

Figure 9:
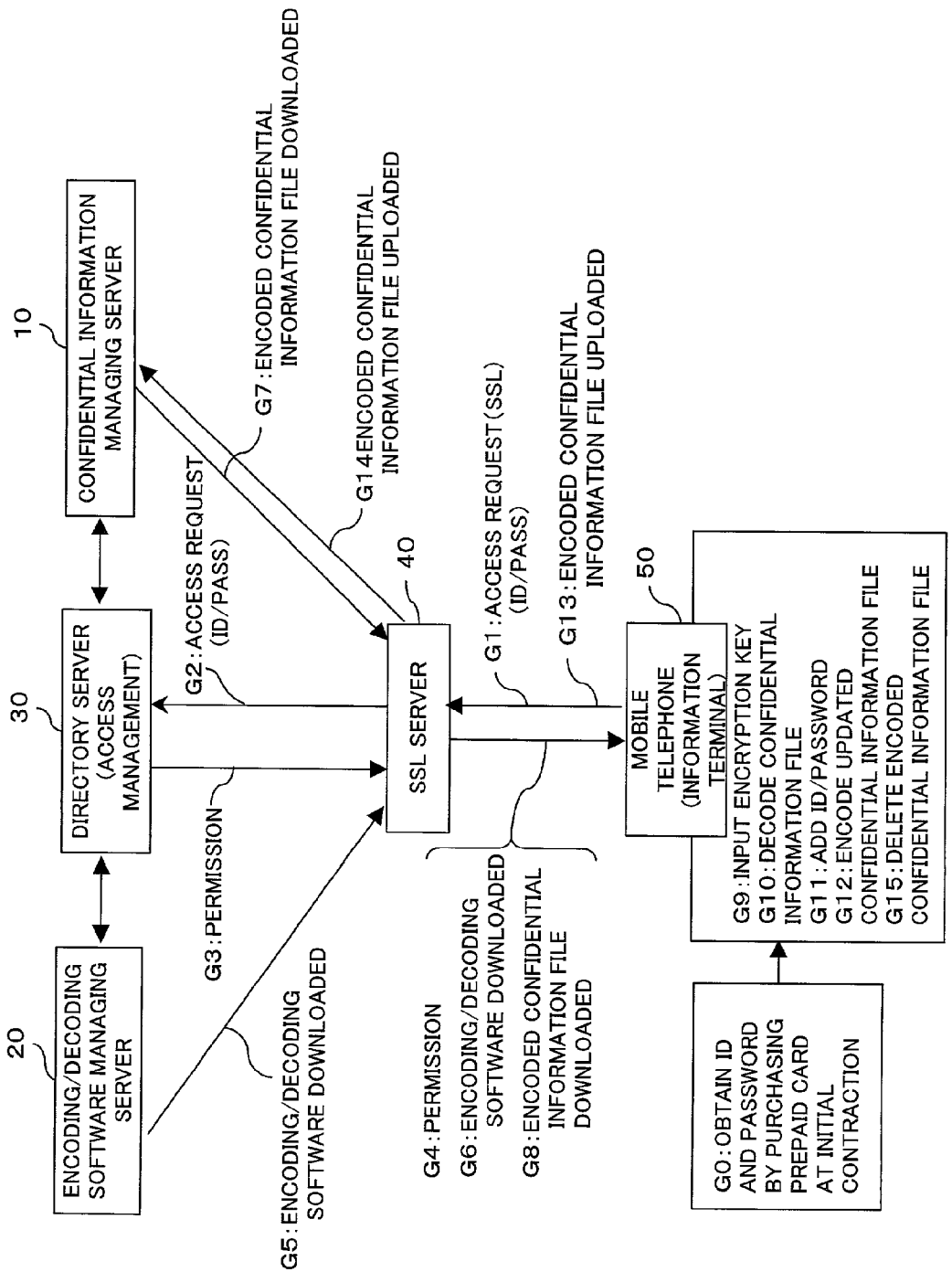
FIG. 9 is a diagram illustrating a procedure for updating the confidential information in the confidential information management system of the present embodiment.

[3-7] Procedure for updating confidential information:

FIG. 9 shows a procedure for updating confidential information in the confidential information management system of the present embodiment. This procedure (step G0 through step G15) is for changing/updating the contents of an encoded confidential information file stored in confidential information managing server 10. A description will be made hereinbelow, of a situation where an additional piece of confidential information (ID/password) for another computer system is added to the confidential information file.

Firstly, the encoded confidential information file is decoded on mobile telephone 50 in such a manner as that described in step G0 through step G10 (step A0 through A10 of FIG. 3). Onto this decoded file, another ID and password are added/recorded through the keyboard 55 (step G11).

The thus updated confidential information file is encoded once again by the CPU 51 with the decoding software downloaded in step G5 and step G6 and with a predetermined encryption key (step G12), and is then uploaded from mobile telephone 50 to the confidential information managing server 10 via SSL server 40 (step G13 and step G14). As in step A12 of FIG. 3, the confidential information file left on mobile telephone 50 is deleted for security purposes (step G15).

In the above example, the procedure is used for adding a piece of confidential information for another computer system, and the above procedure can also be used for making some changes to any existing piece of confidential information (ID/password) stored in the confidential information file.

The reason why the updating (adding/changing) of the confidential information file should be performed on mobile telephone 50, is that, if such updating is carried out on confidential information managing server 10, the confidential information file must once be converted into plain text in confidential information managing server 10, thereby impairing the security of the confidential information. The role of the confidential information managing server 10 is merely to provide an encoded confidential information file anytime and anywhere.

Figure 10:
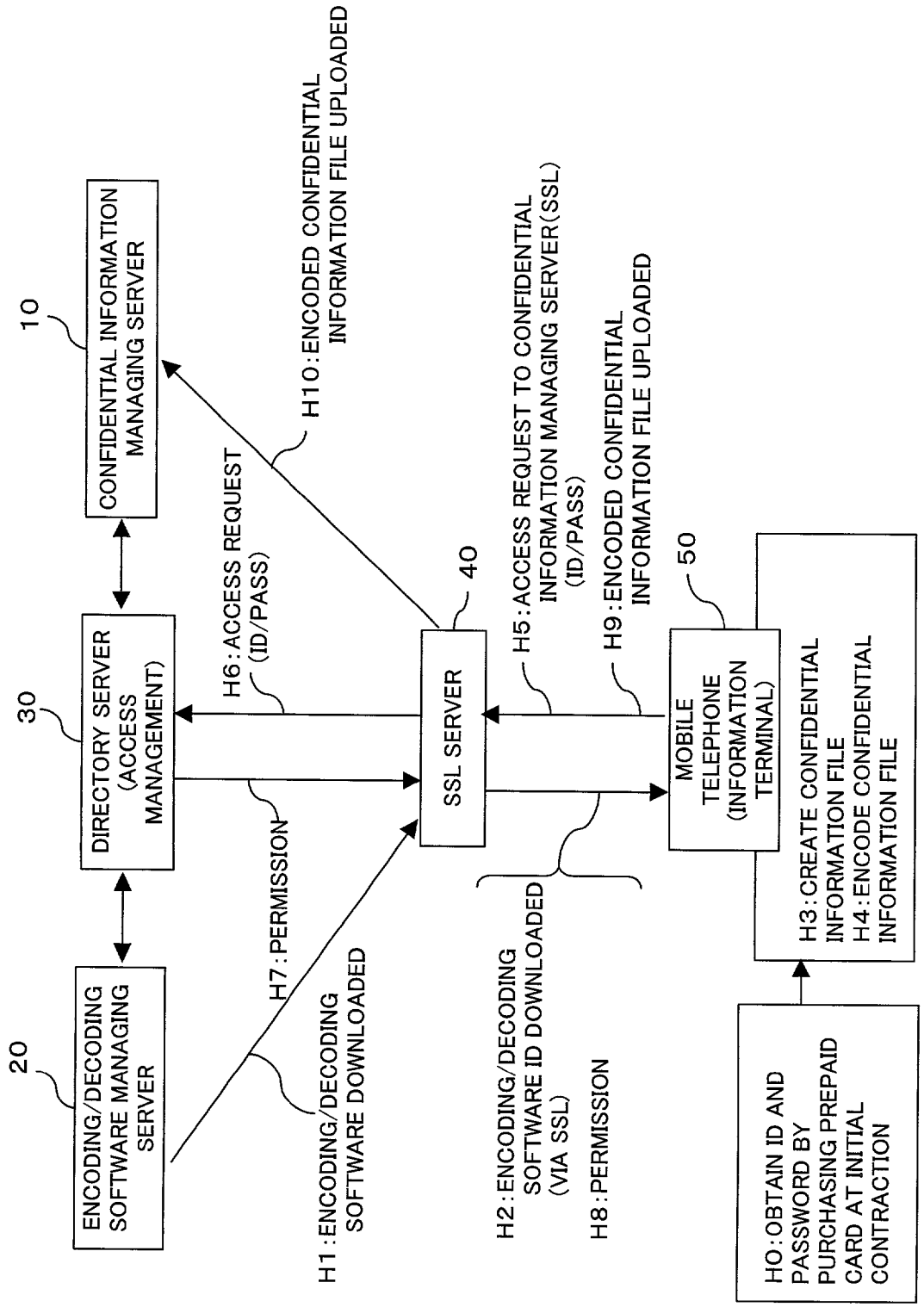
FIG. 10 is a diagram illustrating a first example of a procedure for newly uploading a piece of confidential information in the confidential information management system of the present embodiment.
Figure 11:
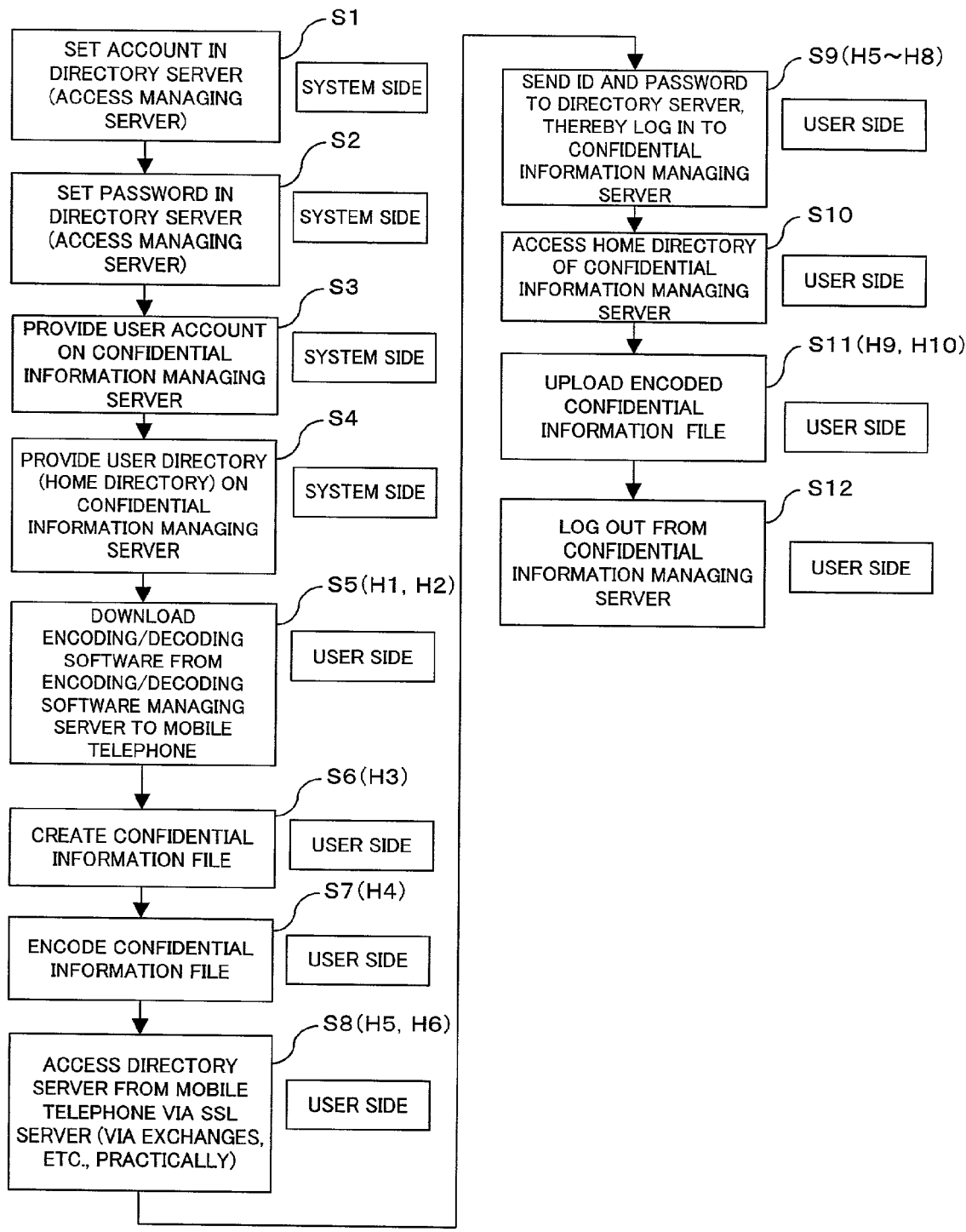
FIG. 11 is a flowchart of the procedure of FIG. 10.

[3-8] First exemplary procedure for newly uploading confidential information:

FIG. 10 and FIG. 11 are a diagram (step H0 through step H10) and a flowchart (step S1 through step S12) respectively, each showing a first example of a procedure for newly uploading a confidential information file in the confidential information management system of the present embodiment. In this example, a user makes a confidential information file (spreadsheet) of his/her own, and uploads the file onto the confidential information managing server 10, in the user-dedicated home directory previously prepared therein.

As shown in step A0 of FIG. 3, the user purchases a prepaid card when initially making a contract with the confidential information management system, and is given, in exchange, an ID and a password for use in the user verification performed at accessing the confidential information management system (step H0 of FIG. 10). Prior to the issuance of the prepaid card, an account and a password are set for the user in the directory server 30 (step S1 and step S2 of FIG. 11), and a user account and a user directory (each user-dedicated home directory) are also set on the confidential information managing server 10 (step S3 and step S4 of FIG. 11).

The user issues a download request from mobile telephone 50 to the encoding/decoding software managing server 20, and downloads the encoding/decoding software therefrom to mobile telephone 50 via the Internet and SSL server 40 (step H1 and step H2 of FIG. 10 and step S5 of FIG. 11).

After that, the user prepares a confidential information file (spreadsheet) in which various confidential information is recorded (step H3 of FIG. 10 and step S6 of FIG. 11), and the confidential information file is then encoded by CPU 51 with the downloaded encoding software and a predetermined encryption key (step H4 of FIG. 10 and step S7 of FIG. 11). This encryption key is stored in the storage unit 53, the external storage medium 80, or the radio token 70, directly or after being converted into a text password.

Next, from mobile telephone 50, the user requests the directory server 30 to permit the user's accessing the confidential information managing server 10 (step H5 and step H6 of FIG. 10 and step S8 of FIG. 11). At that time, under a secure communication environment protected by the SSL server 40, the access request accompanied by the ID and the password, which were provided at purchasing the prepaid card, is transmitted from the mobile telephone 50 to the directory server 30, and thereby the mobile telephone 50 is permitted to log-in to the directory server 30 (step H5 and step H6 of FIG. 10 and step S9 of FIG. 11).

Directory server 30 verifies the user based on the ID and the password received from the mobile telephone 50. Upon confirmation that the ID and the password are those already issued to an existing prepaid card, and also that the amount left on the prepaid card is enough to pay a service charge (or management charge), the directory server 30 notifies the mobile telephone 50 of an access permission via the SSL server 40 (step H7 and step H8 of FIG. 10). At the same time, the permission issuance to mobile telephone 50 is notified to the confidential information managing server 10, which is under control of the directory server 30.

Upon receipt of the access permission, the mobile telephone 50 accesses the home directory prepared on the confidential information managing server 10 (step S10 of FIG. 11), and then uploads the confidential information file encoded in step H4 (S7) onto the user-dedicated home directory which has been prepared for the user previously in the confidential information managing server 10 (step H9 and step H10 of FIG. 10 and step S11 of FIG. 11). After that, the mobile telephone 50 logs-out from the confidential information managing server 10 (step S12 of FIG. 11). The confidential information file left on the mobile telephone 50 is deleted for security purposes.

Figure 12:
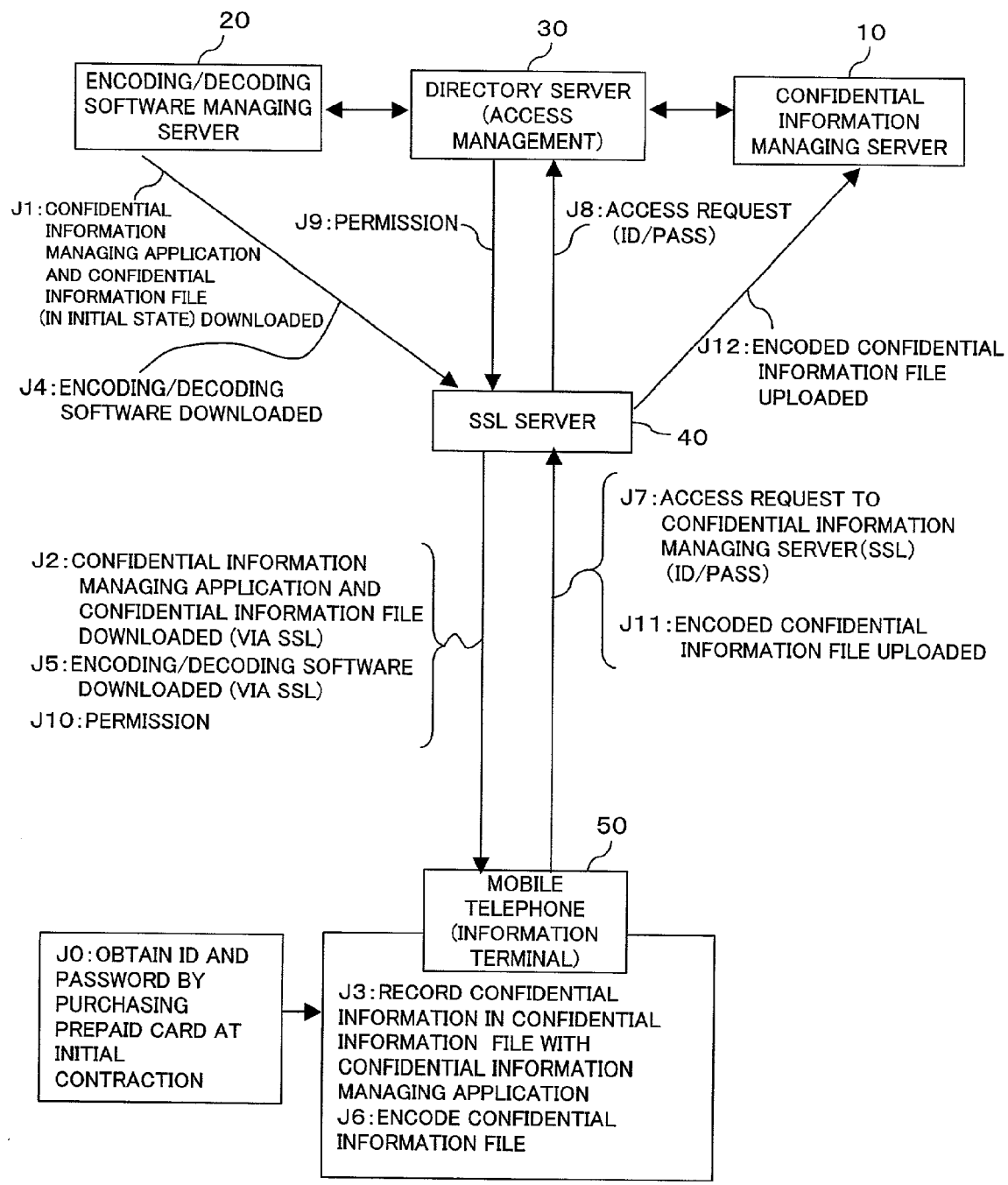
FIG. 12 is a diagram illustrating a second example of the procedure for newly uploading a piece of confidential information in the confidential information management system of the present embodiment.
Figure 13:
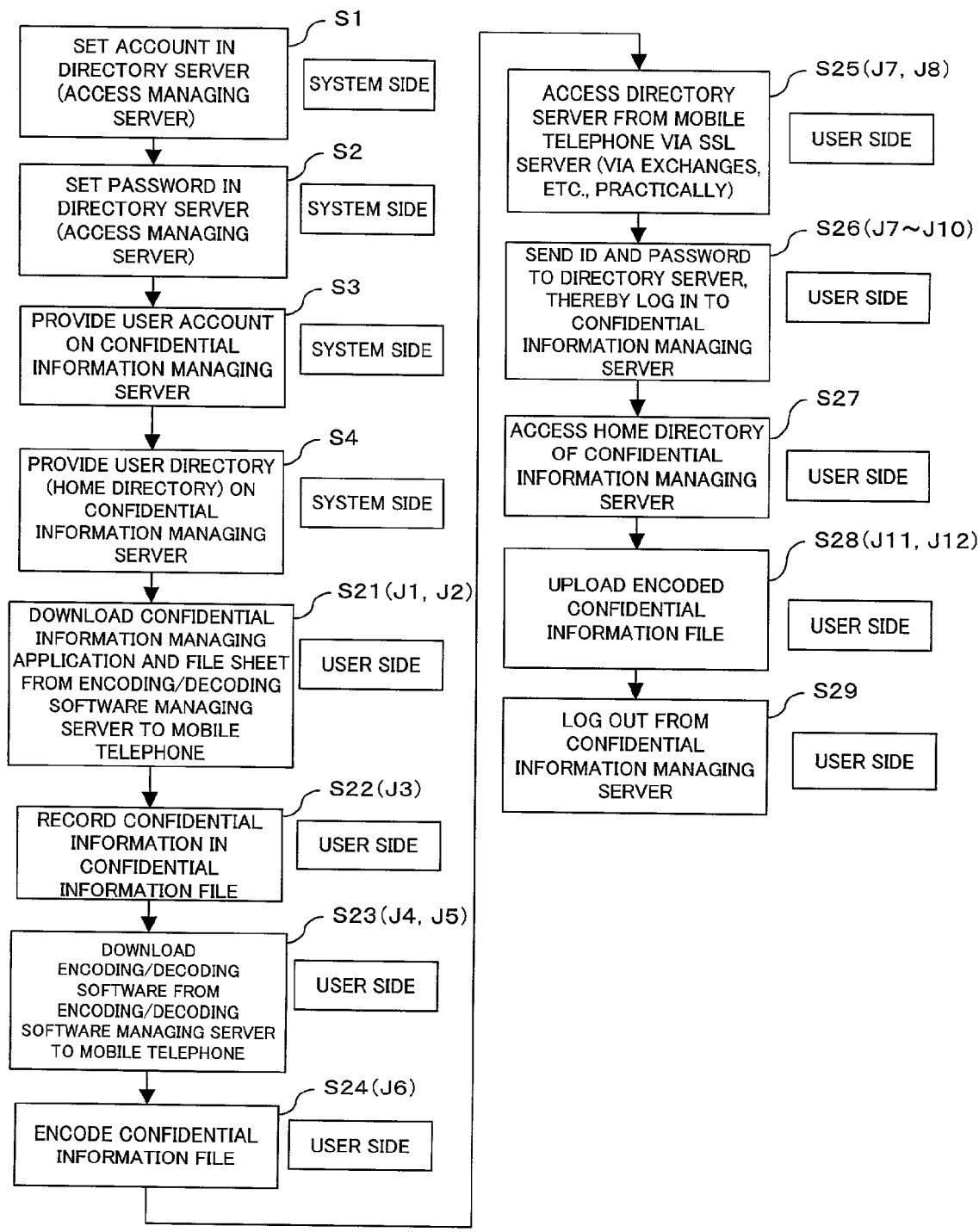
FIG. 13 is a flowchart of the procedure of FIG. 12.

[3-9] Second exemplary procedure for newly uploading confidential information:

FIG. 12 and FIG. 13 are a diagram (step J0 through step J12) and a flowchart (step S1 through step S4 and step S21 through step S29), respectively, each showing a second example of a procedure for newly uploading a confidential information file in the confidential information management system of the present embodiment. In this example, the encoding/decoding software managing server 20 manages not only the encoding/decoding software but also a confidential information managing application and a confidential information file (spreadsheet, file sheet) that is in an original form, and provides these to mobile telephone 50.

In this second example, like in the first example, the user purchases a prepaid card when initially making a contract with the confidential information management system, and is given, in exchange, an ID and a password for use in the user verification performed at accessing the confidential information management system (step J0 of FIG. 12). Prior to the issuance of the prepaid card, the procedure of steps S1 through S4 in the first example of FIG. 11 is also carried out here in the second example.

Then the user issues a download request from mobile telephone 50 to encoding/decoding software managing server 20, and downloads the confidential information managing application and the confidential information file in an original form, to the mobile telephone 50 via the Internet and the SSL server 40 (step J1 and step J2 of FIG. 12 and step S21 of FIG. 13).

Using the confidential information managing application on mobile telephone 50, the user records some confidential information in the downloaded confidential information file (spreadsheet) (step J3 of FIG. 12 and step S22 of FIG. 13).

The user then issues a download request from mobile telephone 50 to the encoding/decoding software managing server 20, and downloads the encoding/decoding software therefrom to the mobile telephone 50 via the Internet and the SSL server 40 (step J4 and step J5 of FIG. 12 and step S23 of FIG. 13).

After that, the confidential information file to which the confidential information is recorded in step J3 (S22), is then encoded by the CPU 51 with the downloaded encoding software and a predetermined encryption key (step J6 of FIG. 12 and step S24 of FIG. 13). This encryption key is stored in storage unit 53, external storage medium 80, or the radio token 70, directly or after being converted into a text password.

The remainder of the procedure, from step J7 through step J12 and from step S25 through step S29, is the same as that from step H5 through step H10 and from step S8 through step S12, so its detailed description is omitted here. In short, like in the first example (FIG. 10 and FIG. 11), the confidential information file encoded in step J6 (S24) is uploaded onto the user-dedicated home directory which has been prepared for the user previously in the confidential information managing server 10.

In the second example, the confidential information managing application and the encoding/decoding software are separately downloaded from the encoding/decoding software managing server 20. As a result, any mobile telephone 50 with a small memory capacity is also applicable to the present confidential information management system.

If the mobile telephone 50 has a memory (storage unit 53) of a sufficient capacity, the above two pieces of software can be downloaded from the encoding/decoding software managing server 20 simultaneously. Moreover, the confidential information managing application and the encoding/decoding software maybe combined together.

Figure 14:
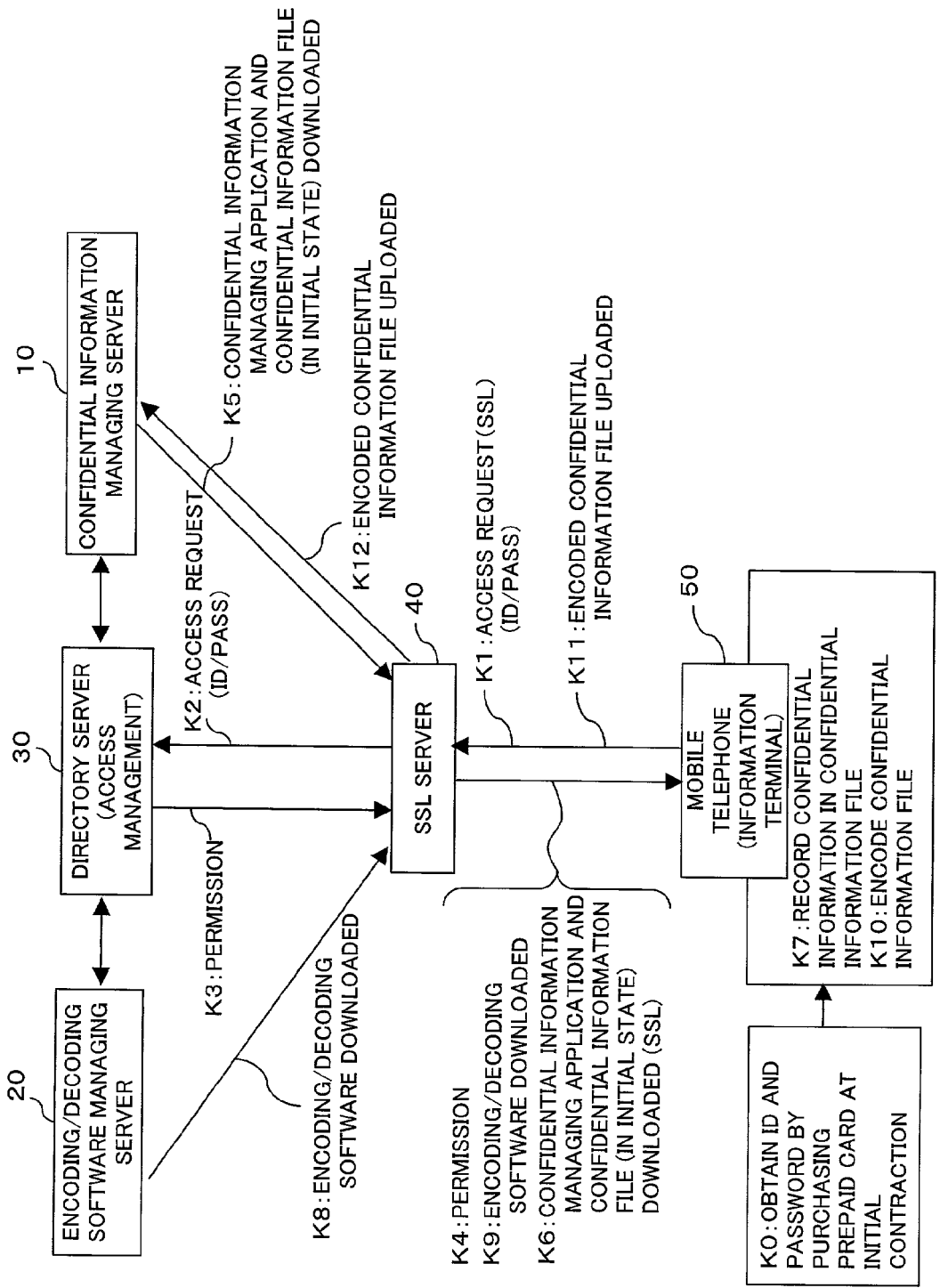
FIG. 14 is a diagram illustrating a third example of the procedure for newly uploading a piece of confidential information in the confidential information management system of the present embodiment.
Figure 15:
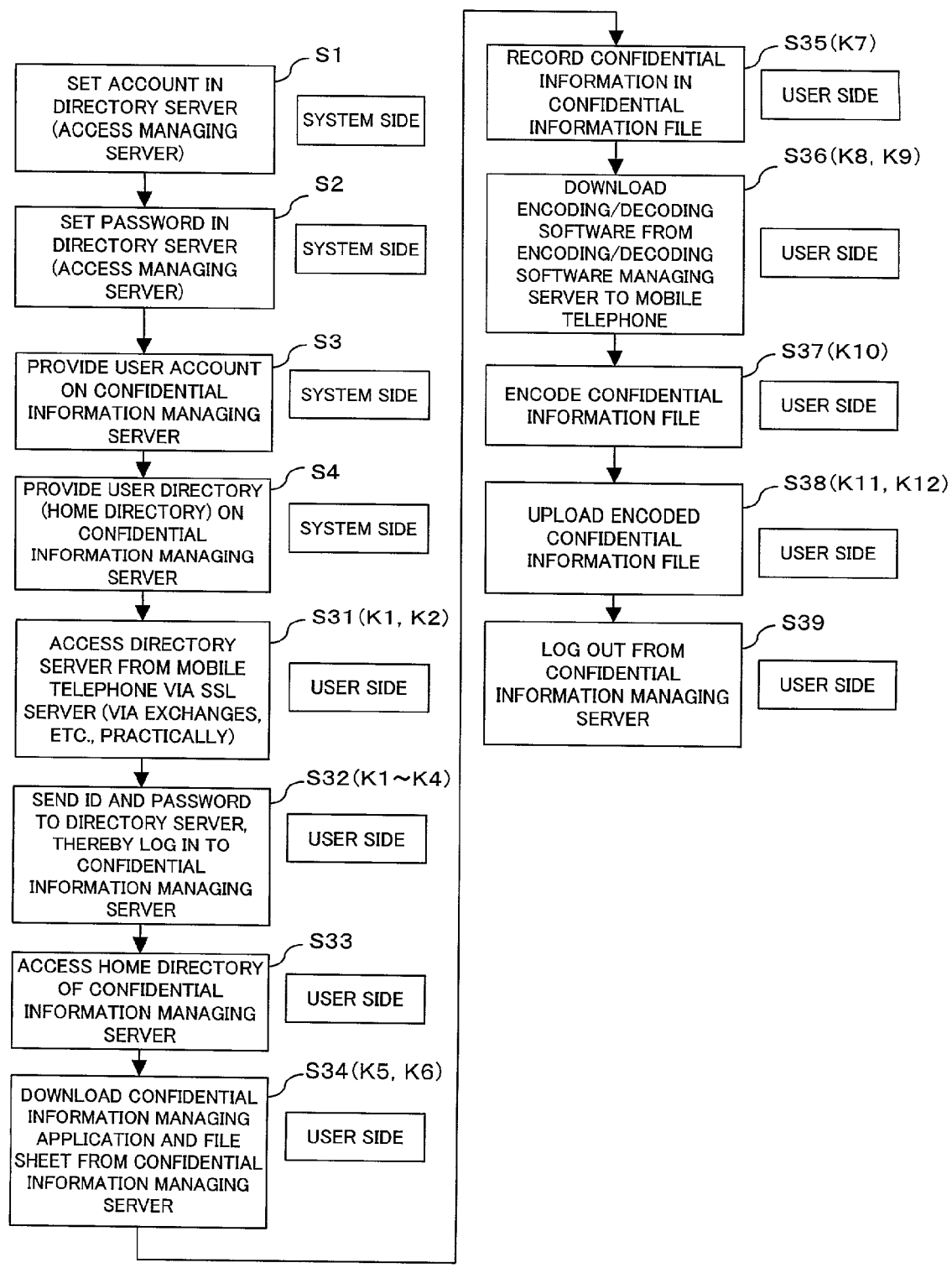
FIG. 15 is a flowchart of the procedure of FIG. 14.

[3-10] Third exemplary procedure for newly uploading confidential information:

FIG. 14 and FIG. 15 are a diagram (step K0 through step K12) and a flowchart (step S1 through step S4 and step S31 through step S39), respectively, each showing a third example of the procedure for newly uploading a confidential information file in the confidential information management system of the present embodiment. In this example, the confidential information managing server 10 manages a confidential information managing application and a confidential information file (spreadsheet, file sheet) that is in an original form, and provides these to mobile telephone 50.

In this third example, also, the user purchases a prepaid card when initially making a contract with the confidential information management system, and obtains an ID and a password, in exchange, for use in the user verification performed at accessing the confidential information management system (step K0 of FIG. 14). Prior to the issuance of the prepaid card, the procedure of steps S1 through S4 in the first example of FIG. 11 is also carried out here in the third example.

Next, from mobile telephone 50, the user requests the directory server 30 to permit the user's accessing the confidential information managing server 10 (step K1 and step K2 of FIG. 14 and step S31 of FIG. 15). At that time, under a secure communication environment protected by the SSL server 40, the access request accompanied by the ID and the password, which were provided at purchasing the prepaid card, is transmitted from the mobile telephone 50 to the directory server 30, and thereby the mobile telephone 50 is permitted to log-in to the directory server 30 (step K1 and step K2 of FIG. 14 and step S32 of FIG. 15).

The directory server 30 verifies the user based on the ID and the password received from the mobile telephone 50. Upon confirmation that the ID and the password are those already issued to an existing prepaid card, and also that the amount left in the prepaid card is enough to pay a service charge (or management charge), the directory server 30 notifies the mobile telephone 50 of an access permission via the SSL server 40 (step K3 and step K4 of FIG. 14). At the same time, the permission issuance to the mobile telephone 50 is notified to the managing servers 10 and 20, which are under control of the directory server 30.

Upon receipt of the access permission, the user accesses the home directory prepared on the confidential information managing server 10 from the mobile telephone 50 (step S33 of FIG. 15), and then the user issues a download request from the mobile telephone 50 to the confidential information managing server 10, and downloads the confidential information managing application and the confidential information file in an original form, to the mobile telephone 50 via the Internet and the SSL server 40 (step K5 and step K6 of FIG. 14 and step S34 of FIG. 15).

Using the confidential information managing application on the mobile telephone 50, the user records some confidential information in the downloaded confidential information file (spreadsheet) (step K7 of FIG. 14 and step S35 of FIG. 15).

The user then issues a download request from mobile telephone 50 to the encoding/decoding software managing server 20, and downloads the encoding/decoding software therefrom to the mobile telephone 50 via the Internet and the SSL server 40 (step K8 and step K9 of FIG. 14 and step S36 of FIG. 15).

After that, the confidential information file to which the confidential information is recorded in step K7 (S35), is then encoded by CPU 51 with the downloaded encoding software and a predetermined encryption key (step K10 of FIG. 14 and step S37 of FIG. 15). This encryption key is stored in storage unit 53, external storage medium 80, or the radio token 70, directly or after being converted into a text password.

The confidential information file thus encoded in step K10 (S37) is then uploaded onto the user-dedicated home directory, which has been prepared for the user previously in the confidential information managing server 10, via the Internet and the SSL server 40 (step K11 and step K12 of FIG. 14 and step S38 of FIG. 15). And, the mobile telephone 50 logs-out from the confidential information managing server 10 (step S39 of FIG. 15). The confidential information left on the mobile telephone 50 is deleted for security purposes.

In this instance, the confidential information managing application and the confidential information file in its original form maybe put either in the user-dedicated home directory which has been previously prepared on the confidential information managing server 10, or on the confidential information managing server 10.

[4] Effects of the present embodiment:

The confidential information management system and the mobile telephone (information terminal) 50 of the present invention guarantee the following advantageous results.

[4-1] Since confidential information files containing various confidential information or confidential executing programs, which files are securely stored in the confidential information managing server 10, are obtained in a safe manner anywhere at any time using a minimum of confidential information (a single ID and a couple of passwords, or biometric feature information), it is possible to free users from memorizing or taking notes of numerous passwords or personal identification codes, thereby resolving various problems relevant to the management and the securing of confidential information files. In addition, even if such passwords or personal identification codes are made up of a string of characters that is difficult to memorize, it is possible to obtain the passwords or the personal identification codes in a safe manner anywhere at any time, as well as to store the passwords or the personal identification codes securely. The use of easy passwords or personal identification codes vulnerable to abuse can thus be prevented, thereby significantly improving the security level of the user verification system that employs password verification. Accordingly, the present invention provides effective and secure use of a general type of password verification without using a single-sign-on system or any other system, nor making any changes to existing user verification infrastructures.

[4-2] Since such a confidential information file is stored in confidential information managing server 10 in an encoded form, it cannot be decoded without using a type of decoding software corresponding to the encoding software by which the confidential information file has been encoded. It is thus possible to prevent an administrator of the confidential information managing server 10 from misusing the confidential information files, and also, even if a confidential information file should be intercepted or leaked, a third party cannot see the contents of the confidential information file, thereby guaranteeing a high level of security (safety).

[4-3] Since the confidential information files are encoded, the security of a one-to-one communication between the confidential information managing server 10 and mobile telephone 50 can be retained, thus facilitating the construction of the confidential information managing server 10 and confidential information systems that require a high level of security.

[4-4] The encoding/decoding software can be downloaded from a dedicated purpose server 20. So, provided most mobile telephones are associated with the present confidential information managing system, it is possible for the user to use another person's mobile telephone for browsing or making changes to his/her confidential information file in a safe manner even when the user does not carry a mobile telephone 50 of his/her own.

[4-5] Since the confidential information file containing passwords and personal identification codes can be obtained anywhere at any time with use of the present confidential information management system and the mobile telephone 50, it is possible to significantly reduce the maintenance cost (total cost of ownership: TCO) of the systems which employ the password verification.

[4-6] If applied to the systems employing PKI verification, the confidential information management system and mobile telephone 50 of the present embodiment surely prevent an encryption key for PKI (public key infrastructure) from being made invalid due to inadvertent handling. It is thus possible to prevent a list of invalid digital certificates from becoming too big.

[4-7] Since the confidential information file is transmitted between each mobile telephone 50 and the confidential information managing server, which are connected in a one-to-one relationship, it is possible to employ biometric information-utilized user verification with ease to verify the user who intends to access a confidential information file stored in the server. Further, user verification using two or more types of biometric information is also facilitated.

[4-8] Since the directory server 30 performs the user verification collectively, it is possible to manage access attempts of the user from the mobile telephone 50 to each managing server 10 and 20, under centralized control by the access managing server. Each managing server 10, 20 is thus rendered free from making user verification separately, thereby simplifying the processing carried out by each managing server 10 and 20.

[4-9] Since the use of SSL server 40 guarantees the security of the above-mentioned minimal confidential information (a single ID and a couple of passwords), which is transmitted from the mobile telephone 50 to the directory server 30, an improved security level is realized in the confidential information managing system.

[4-10] As described with reference to FIG. 9 through FIG. 15, since anew confidential information file or a confidential information file to which any change has been made is encoded on the mobile telephone 50 before being sent to the confidential information managing server 10 to be stored therein, it is possible to realize a sufficient level of security of the confidential information even if communication between the confidential information managing server and the information terminal does not comply with the security features of SSL. Mobile telephones commonly distributed in the market are thus applicable to the confidential information managing system of the present embodiment.

[4-11] As shown in FIG. 9, if any addition or changes are made, on mobile telephone 50, to the confidential information file such as a spreadsheet and a data base, the confidential information file is encoded before being sent to the confidential information managing server 10, and thereby the user makes some addition or changes to the contents of the confidential information file with significant ease. Likewise, as described in FIG. 10 through FIG. 15, when a new piece of confidential information is written in a confidential information file, such as a spreadsheet and a data base, on the mobile telephone 50, the new confidential information file is encoded before being sent to the confidential information managing server 10, thereby making it significantly easy for the user to register/store a new confidential information file in the confidential information managing server 10.

[4-12] As described in item (d1) with reference to FIG. 3 and FIG. 4, since the contents of the encoded confidential information file is shown on the display 54 of the mobile telephone 50, it is possible for the user to view the contents immediately.

[4-13] As described in item (d3) with reference to FIG. 3 and FIG. 4, since both computer system names (bank names, credit company names, device names) and the confidential information (IDs, passwords, personal identification codes, etc.) associated with each of the computer system names are shown on display 54, it is possible to input the required information to a computer system whose name is identical with the computer system name shown on the display 54.

[4-14] As described in item (d4) with reference to FIG. 3 and FIG. 4, only the computer system names may be shown on display 54. Referring to those computer system names on display 54, the user specifies one of them with predetermined key operations. The confidential information associated with the user-specified computer system name is sent to a computer system (a server of a bank or a credit company, or various devices) whose name is identical with the computer system name. As a result, the confidential information itself is no longer shown on the display 54, thereby further improving the security of the confidential information. At the same time, since the user is freed from inputting the confidential information with some key operations, the operation to be made by the user is simplified and unscrupulous viewing and abuse by third parties of confidential information input by the user is prevented.

[4-15] As described in item (d5) with reference to FIG. 6, with the lapse of a predetermined time after completion of the decoding of the confidential information file, the CPU 51 automatically deletes the decoded confidential information file stored in storage unit 53 of mobile telephone 50. Therefore, there is no possibility of the confidential information file held in the mobile telephone 50 being stolen by a third party, thereby guaranteeing improved security of the confidential information file.

[4-16] As described in item (d6) with reference to FIG. 6, the contents of the decoded confidential information file stored in storage unit 53 are shown on display 54 upon completion of the user verification made by the CPU 51 (verifying means 51a) of the mobile telephone 50. Therefore, the contents of the confidential information file are securely stored in storage unit 53 of mobile telephone 50, while only an authorized user is allowed to show the contents on the display 54.

[4-17] As described in item (d2) with reference to FIG. 7, upon the decoding of the confidential information file, a program (confidential execution program, etc.) contained in the decoded confidential information file is executed by the CPU 51 of mobile telephone 50, and thus it is possible for mobile telephone 50 to automatically move to the operation instructed by that program.

[4-18] As described in item (e1) with reference to FIG. 7, the radio token 70, which is carried by the user, wirelessly communicates with mobile telephone 50 periodically so that the decoded confidential information file is deleted on the mobile telephone 50 unless the mobile telephone 50 receives a periodic response from the radio token 70. It is thus possible to delete the confidential information file stored in the storage unit 53 of the mobile telephone 50 automatically, if the user with the radio token 70 is apart from the mobile telephone 50, or if the mobile telephone 50 is stolen away from the user, thereby preventing the confidential information file from being stolen by a third party and thus guaranteeing improved security of the confidential information file.

[4-19] As described in item (e2) and item (f6) the radio token 70 holds the encryption key information, and sends the information to the mobile telephone 50 on a request from mobile telephone 50. It is thus possible only for a user who carries a radio token 70 to decode the confidential information file with use of the encoding/decoding software, and it is no longer necessary to take notes of the encryption key information nor to store such information in a memory of any information device.

[4-20] As described in item (e3), the radio token 70 is activated in response to the user verification with a password on the mobile telephone 50, and also, as described in item (e4), the radio token 70 sends the encryption key information to the mobile telephone 50 only when it detects a predetermined ID number of mobile telephone 50. It is thus possible to securely store the encryption key information in radio token 70.

[4-21] As described in item (f2), since the encryption key for use in decoding the confidential information file is generated from a predetermined text password that is input by the authorized user to the mobile telephone 50, it is possible to input the encryption key to the mobile telephone 50 as a kind of password.

[4-22] As described in item (f3) through item (f5), since the mobile telephone 50 includes the interface 56 to the external storage medium 80 that holds the encryption key information, it is possible to input the encryption key information from the external storage medium 80 to the mobile telephone 50 via the interface 56. This would free the user from inputting the encryption key information by herself/himself, thereby simplifying user operation, and also preventing the encryption key information input by the user from being unscrupulously viewed and abused by a third party.

[4-23] Since mobile telephone 50 downloads a suitable one of the plural types of encoding/decoding software stored in the managing server 20 at a fixed time interval, and periodically alters an encoding system currently used in the confidential information file stored in the confidential information managing server 10 into another that is offered by the downloaded encoding/decoding software, it is possible to guarantee an improved level of security of the confidential information file.

[4-24] Since the user obtains an ID (identification information) and a password, which authorize the user to access the confidential information management system, by purchasing a prepaid card, it is possible to protect the user's anonymity with respect to the confidential information management system. That is, it cannot be identified which one of the files stored in the confidential information managing server 10 belongs to whom, thereby preventing misuse of such confidential information files. Moreover, the prepaid cards are convenient to collect charges (management charges) for use of the confidential information management system, in advance, at the time of issuance of IDs and passwords. In the meantime, the charges may be paid into a bank account based on an anonymous contract. Also in this case, since it cannot be identified which one of the confidential information files stored in the confidential information managing server 10 belongs to whom, the misuse of the encoded confidential information file can be effectively prevented.

[4-25] Since each of the information terminals is a mobile telephone 50 which is connectable to the Internet, it is possible to download a confidential information file anywhere at any time over the Internet. At that time, if the subscriber number of the mobile telephone is used as the user's ID information, as described in item (g1), it is possible to employ a call-back system of mobile telephone 50 to verify the user. Moreover, since the mobile telephone 50 can connect with the Internet immediately after the power is turned on, it is possible to view the confidential information (IDs, passwords, etc.) more promptly on the mobile telephone 50 than on a personal computer, which normally takes a relatively long time to start up and then connect with the Internet.

[4-26] As described with reference to FIG. 4, since biometric information is used in the user verification, it is no longer necessary for the user to input a password for downloading the confidential information file, and the security level of the confidential information file is also improved.

[4-27] As described in item (g2) with reference to FIG. 5, the biometric information-utilized user verification is performed on the mobile telephone 50, and upon completion of the user verification, the information for verifying the user (b1) and the encryption key information (b2) are read out from the storage unit 53 of the mobile telephone 50. It is thus possible to store and manage such information (b1) and (b2) securely on mobile telephone 50.

[4-28] At that time, since the biometric user verification can be carried out separately for individual users (for each mobile telephone 50), it is possible to employ the biometric user verification without making any changes to existing user verification infrastructures. And also, since the type of biometric information to be used in the verification is selected by the user on his/her own, that most convenient to the user can be selected. Moreover, if voice print is selected, since a digital signal processor of the mobile telephone 50 can be used, the user verification can be carried out offline. Accordingly, it is possible to avoid a failure of verification caused by voice compression encountered at an online verification.

[5] Other Modifications

Further, the present invention should by no means be limited to the above-illustrated embodiment, but various changes or modifications may be suggested without departing from the gist of the invention.

For example, in the above description, the information terminal is an Internet-connectable mobile telephone. Any network-connectable information terminal, which can receive the above-described confidential information management service, is also applicable to the present invention, and it guarantees like effects to those described in the above embodiment. Concrete examples of such information terminals are, say, PDAs, IC cards having a radio communication function, notebook computers, and so on.

Furthermore, in the above-embodiment, the confidential information files, the encoding/decoding software, and the confidential information management application can be produced with use of general-purpose software created (programmed) in JAVA, so that they can then run on a variety of types of mobile telephones.

What is claimed is:

1. A confidential information management system, comprising:
    a confidential information managing server storing and managing confidential information files each in an encoded form in such a manner that each of the confidential information files is available to only an authorized user;
    an encoding/decoding software managing server storing and managing encoding/decoding software that encodes/decodes the individual confidential information files; and
    one or more information terminals each capable of having access to both said confidential information managing server and said encoding/decoding software managing server via a communications network, each said information terminal having an environment such as to operate said encoding/decoding software,
    said information terminal being operable, after an authorized user who intends to access an individual confidential information file is verified, to download the individual confidential information file and said encoding/decoding software from said confidential information managing server and said encoding/decoding software managing server, respectively, and to decode the downloaded confidential information file using said encoding/decoding software,
    wherein said encoding/decoding software managing server stores two or more types of encoding/decoding software so as to be downloaded to said information terminal, and
    said information terminal downloads a suitable one of such plural types of encoding/decoding software at a fixed time interval, and alters an encoding system currently used in the confidential information file stored in said confidential information managing server into another encoding system that is offered by the downloaded encoding/decoding software.

2. A confidential information management system according to claim 1, further comprising
    an access managing server managing access attempts of the user from said information terminal to both said confidential information managing server and said encoding/decoding software managing server by verifying the user,
    said access managing server being operable, upon completion of the user verification, to permit said information terminal to access both said confidential information managing server and said encoding/decoding software managing server.

3. A confidential information management system according to claim 2, further comprising a secure server providing a secure environment in communications between said access managing server and said information terminal.

4. A confidential information management system according to claim 1, wherein said information terminal is operable, if any change has been made to the decoded confidential information file, or if a new confidential information file is intended to be stored in said confidential information managing server, to encode the resulting confidential information file or the new confidential information file using said encoding/decoding software before uploading such encoded confidential information file to said confidential information managing server.

5. A confidential information management system according to claim 1, wherein said information terminal has a display on which the contents of the decoded confidential information file are to be shown.

6. A confidential information management system according to claim 1, wherein the decoded confidential information file contains a program to be executed on said information terminal.

7. A confidential information management system according to claim 5, wherein the contents of the confidential information file shown on said display on said information terminal include both a computer system name and confidential information associated therewith.

8. A confidential information management system according to claim 5, wherein:
    the contents of the confidential information file shown on said display on said information terminal include only a computer system name; and
    said information terminal has communications means, responsive to a predetermined operation made by the user, for sending confidential information associated with said computer system name to a computer system whose name is identical with said computer system name shown on said display.

9. A confidential information management system according to claim 1, wherein with lapse of a predetermined time after completion of the decoding of the confidential information file, the decoded confidential information file is deleted on said information terminal.

10. A confidential information management system according to claim 5, wherein said information terminal includes:
verifying means for verifying the user; and
storage means for storing the contents of the decoded confidential information file in such a manner that the stored contents of the decoded confidential information file is shown on said display upon completion of the user verification by said verifying means.

11. A confidential information management system according to claim 1, further comprising a radio token, carried by the user, wirelessly communicating with said information terminal periodically so that the decoded confidential information file is deleted on said information terminal unless said information terminal receives a periodic response from said radio token.

12. A confidential information management system according to claim 11, wherein:
said radio token holds information relevant to an encryption key needed for decoding the confidential information file, and sends the information to said information terminal on a request from said information terminal; and
said information terminal receives the information, relevant to said encryption key, from said radio token when decoding the confidential information file.

13. A confidential information management system according to claim 12, wherein said radio token is activated in response to the user verification with a password on said information terminal.

14. A confidential information management system according to claim 1, wherein said information terminal generates an encryption key, needed for decoding the confidential information file, from a predetermined text password that is input to said information terminal by the authorized user.

15. A confidential information management system according to claim 1, wherein said information terminal includes an interface to an external storage medium that holds information relevant to an encryption key for decoding the confidential information file, so that said information terminal receives the information from said external storage medium via said interface when decoding the confidential information file.

16. A confidential information management system according to claim 1, wherein the user obtains identification (ID) information and a password, which authorize the user to access said confidential information managing server, by purchasing a prepaid card.

17. A confidential information management system according to claim 1, wherein each said information terminal is a mobile telephone connectable to the Internet.

18. A confidential information management system according to claim 17, wherein the subscriber number of said mobile telephone is used as the ID information of the user.

19. A confidential information management system according to claim 1, wherein said information terminal includes sampling means for sampling biometric information of the user for use in verifying the user.

20. A confidential information management system according to claim 1, wherein said information terminal includes:
sampling means for sampling said biometric information of the user;
verifying means for verifying the user using said biometric information sampled by said sampling means; and
storage means for storing first information relevant to an encryption key needed for decoding the confidential information file or second information needed for verifying the user, so that one of said first and second information stored in said storage means is read out upon completion of the user verification by said verifying means.

21. An information terminal adapted to be capable of having access to both a confidential information managing server, which stores and manages confidential information files each in an encoded form in such a manner that each of the confidential information files is available to only an authorized user, and an encoding/decoding software managing server, which stores and manages encoding/decoding software for encoding/decoding the individual confidential information files, via a communications network, wherein:
said information terminal has an environment such as to operate said encoding/decoding software; and
after an authorized user who intends to access an individual confidential information file is verified, said information terminal is operable to download the individual confidential information file and said encoding/decoding software from the confidential information managing server and the encoding/decoding software managing server, respectively, and to decode the downloaded individual confidential information file using said encoding/decoding software,
wherein said encoding/decoding software managing server stores two or more types of encoding/decoding software so as to be downloaded to said information terminal, and
said information terminal downloads a suitable one of such plural types of encoding/decoding software at a fixed time interval, and alters an encoding system currently used in the confidential information file stored in said confidential information managing server into another encoding system that is offered by the downloaded encoding/decoding software.

22. An information terminal according to said claim 21, wherein if any change has been made to the decoded confidential information file, or if a new confidential information file is intended to be stored in said confidential information managing server, the resulting confidential information file or the new confidential information file is encoded using said encoding/decoding software before uploaded to said confidential information managing server.

23. An information terminal according to said claim 21, having a display on which the contents of the decoded confidential information file are to be shown.

24. An information terminal according to said claim 22, having a display on which the contents of the decoded confidential information file are to be shown.

25. An information terminal according to claim 21, wherein the decoded confidential information file contains a program that is to be executed on said information terminal.

26. An information terminal according to claim 22, wherein the decoded confidential information file contains a program that is to be executed on said information terminal.

27. An information terminal according to claim 24, wherein the contents of the confidential information file shown on said display include both a computer system name and confidential information associated therewith.

28. An information terminal according to claim 24, wherein the contents of the confidential information file shown on said display include both a computer system name and confidential information associated therewith.

29. An information terminal according to claim 23, wherein:
the contents of the confidential information file shown on said display include only a computer system name; and
said information terminal has communications means, responsive to a predetermined operation made by the user, for sending confidential information associated with said computer system name to a computer system whose name is identical with said computer system name shown on said display.

30. An information terminal according to claim 24, wherein:
the contents of the confidential information file shown on said display include only a computer system name; and
said information terminal has communications means, responsive to a predetermined operation made by the user, sending confidential information associated with said computer system name to a computer system whose name is identical with said computer system name shown on said display.

31. An information terminal according to claim 21, wherein with lapse of a predetermined time after completion of the decoding of the confidential information file, the decoded confidential information file is deleted on said information terminal.

32. An information terminal according to claim 22, wherein with lapse of a predetermined time after completion of the decoding of the confidential information file, the decoded confidential information file is deleted on said information terminal.

33. An information terminal according to claim 23, wherein with lapse of a predetermined time after completion of the decoding of the confidential information file, the decoded confidential information file is deleted on said information terminal.

34. An information terminal according to claim 24, wherein with lapse of a predetermined time after completion of the decoding of the confidential information file, the decoded confidential information file is deleted on said information terminal.

35. An information terminal according to claim 25, wherein with lapse of a predetermined time after completion of the decoding of the confidential information file, the decoded confidential information file is deleted on said information terminal.

36. An information terminal according to claim 26, wherein with lapse of a predetermined time after completion of the decoding of the confidential information file, the decoded confidential information file is deleted on said information terminal.

37. An information terminal according to claim 27, wherein with lapse of a predetermined time after completion of the decoding the confidential information file, the decoded confidential information file is deleted on said information terminal.

38. An information terminal according to claim 28, wherein with lapse of a predetermined time after completion of the decoding of the confidential information file, the decoded confidential information file is deleted on said information terminal.

39. An information terminal according to claim 29, wherein with lapse of a predetermined time after completion of the decoding of the confidential information file, the decoded confidential information file is deleted on said information terminal.

40. An information terminal according to claim 30, wherein with lapse of a predetermined time after completion of the decoding of the confidential information file, the decoded confidential information file is deleted on said information terminal.

41. An information terminal according to claim 23, comprising:
verifying means for verifying the user; and
storage means for storing the contents of the decoded confidential information file so as to be shown on said display upon completion of the user verification by said verifying means.

42. An information terminal according to claim 24, comprising:
verifying means for verifying the user; and
storage means for storing the contents of the decoded confidential information file so as to be shown on said display upon completion of the user verification by said verifying means.

43. An information terminal according to claim 21, comprising:
sampling means for sampling biometric information of the user;
verifying means for verifying the user using said biometric information sampled by said sampling means; and
storage means for storing first information relevant to an encryption key needed for decoding the confidential information file or second information needed for verifying the user so that one of said first and second information stored in said storage means is read out upon completion of the user verification by said verifying means.

44. A method of managing confidential information for a user, comprising:
storing two or more types of encoding/decoding software;
downloading confidential information and a suitable one of such plural types of encoding/decoding software at a fixed time interval to a receiver;
executing the decoding software;
inputting biometric information from the user and extracting biometric feature data using the executed decoding software;
verifying the extracted biometric feature data and reading out an encryption key;
decoding a confidential information file using the encryption key; and
altering an encoding system currently used in a confidential information file stored in a confidential information managing server into another encoding system that is offered by the downloaded encoding/decoding software.

45. The method of managing confidential information for a user according to claim 44, further comprising deleting the confidential information file after browsing the confidential information file.

46. The method of managing confidential information for a user according to claim 44, wherein the receiver is a mobile telephone.

* * * * *